(12) United States Patent
Smith et al.

(10) Patent No.: US 10,812,132 B1
(45) Date of Patent: Oct. 20, 2020

(54) ACTIVE GEO-LOCATION RANGE FOR WIRELESS LOCAL AREA NETWORK DEVICES

(71) Applicant: SR Technologies, Inc., Sunrise, FL (US)

(72) Inventors: Conrad C. Smith, Parkland, FL (US); Graham K. Smith, Boca Raton, FL (US)

(73) Assignee: SR Technologies, Inc., Sunrise, FL (US)

(*) Notice: Subject to any disclaimer, the term of this patent is extended or adjusted under 35 U.S.C. 154(b) by 0 days.

(21) Appl. No.: 16/782,762

(22) Filed: Feb. 5, 2020

Related U.S. Application Data

(60) Provisional application No. 62/958,090, filed on Jan. 7, 2020.

(51) Int. Cl.
| | |
|---|---|
| *H04B 1/709* | (2011.01) |
| *G01S 5/02* | (2010.01) |
| *H04W 4/029* | (2018.01) |
| *H04W 74/08* | (2009.01) |
| *H04W 72/04* | (2009.01) |
| *H04W 80/02* | (2009.01) |
| *H04B 7/185* | (2006.01) |

(52) U.S. Cl.
CPC ............ *H04B 1/709* (2013.01); *G01S 5/0221* (2013.01); *H04B 7/18504* (2013.01); *H04W 4/029* (2018.02); *H04W 72/0466* (2013.01); *H04W 74/0808* (2013.01); *H04W 80/02* (2013.01)

(58) Field of Classification Search
CPC .......... G01S 19/11; G01S 19/24; G01S 19/42; G01S 19/30; G01S 19/235; G01S 19/29; G01S 5/021; G01S 5/0009; G01S 5/0018; G01S 5/0063; G01S 5/0236; G01S 5/0263; G01S 11/10; G01S 5/0273; G01S 5/06; G01S 5/30; H04W 64/00; H04W 72/0446; H04W 4/029; H04W 56/005; H04W 4/027; H04W 12/00503; H04W 4/024; H04W 56/002; H04W 64/003
See application file for complete search history.

(56) References Cited

U.S. PATENT DOCUMENTS

| | | | |
|---|---|---|---|
| 2004/0041728 A1* | 3/2004 | Bromley | .................. G01S 19/29 342/357.64 |
| 2005/0080561 A1* | 4/2005 | Abraham | .............. G01S 19/235 701/469 |
| 2007/0040740 A1* | 2/2007 | Abraham | .............. G01S 5/0205 342/357.59 |

\* cited by examiner

*Primary Examiner* — Kwasi Karikari
(74) *Attorney, Agent, or Firm* — Christopher & Weisberg, P.A.

(57) ABSTRACT

A method and devices are disclosed that increase the range of active geo-location from the airborne measuring station as compared with known methods by increasing the effective receive sensitivity of the airborne measuring station. In one embodiment, this may be accomplished by transmitting a burst of predetermined ranging packets and recording the correlation values of each received bit stream of the response packets with the corresponding predetermined bit streams for each of the transmitted ranging packets within a preset reception window. A rolling maximum is then performed on the correlation values in each reception window. At the end of the burst, the rolling maximum results are summed and the time of the peak value is determined.

20 Claims, 19 Drawing Sheets

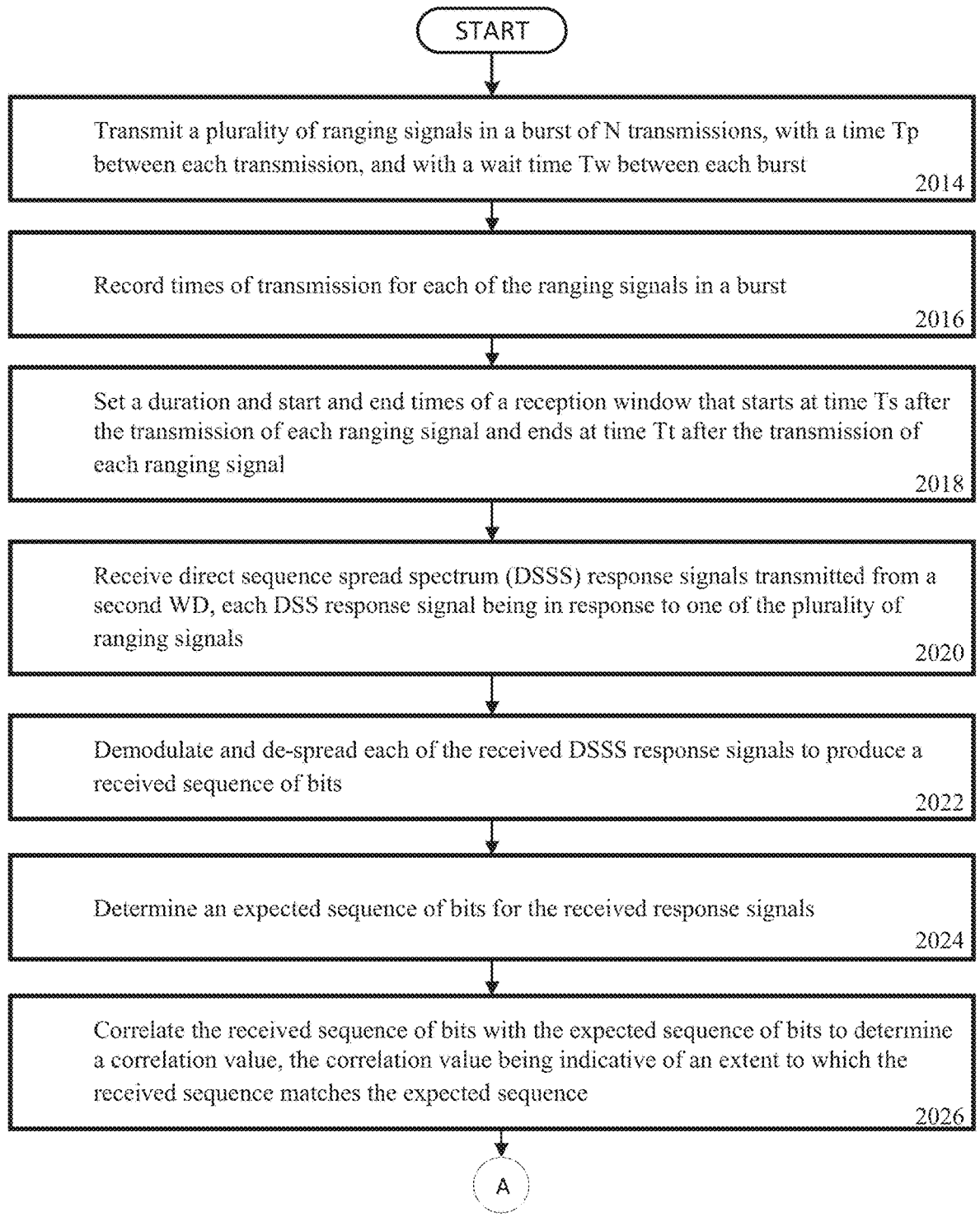

FIG.22

Record a plurality of correlation values for a duration of a reception window for each of the plurality of ranging signal transmissions
2028

Calculate a rolling maximum value, M, of the recorded correlation values for the duration of the reception window for each of the plurality of ranging signal transmissions
2030

Detect a completion of a burst of ranging signals
2032

Calculate a sum of the rolling maximums
2034

Determine a peak value of the sum of the rolling maximums
2036

Record a time of the peak value referenced to an end of the plurality of ranging signal transmissions
2038

Determine a geo-location of the second WD based at least in part on a time of transmission of a ranging signal and the time of the peak value of the sum of the rolling maximums
2040

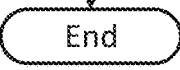

ACTIVE GEO-LOCATION RANGE FOR WIRELESS LOCAL AREA NETWORK DEVICES

CROSS-REFERENCE TO RELATED APPLICATION

This Application is related to and claims priority of U.S. Provisional Patent Application No. 62/958,090 filed Jan. 7, 2020, the entirety of which is incorporated herein by reference.

TECHNICAL FIELD

The present disclosure relates to geo-location of wireless devices, and in particular to a method, device and system for the geo-location of wireless local area network (WLAN) devices.

BACKGROUND

Initially, it is noted that IEEE Standard 802.11—2016 is used as the base reference for disclosures used herein, the entire contents of which are incorporated herein by reference. The IEEE 802.11—2016 Standard is commonly referred to as "Wi-Fi" and is referred to as such herein.

The location of wireless devices can be determined by various methods. These methods may be classified as active, passive and combined active and passive. In an active location scheme, a device that is determining the location or range, the measuring device, transmits certain packets to the device being located, i.e., the target device, and a common method is to measure the time of arrival (TOA) of the response packet from the target device and compare that to the time of departure (TOD) of the request packet that was transmitted by the measuring device so as to determine the round trip time (RTT).

In such location systems it is common to use multiple measuring devices to determine the location. In such a scheme, simultaneous TOA and/or TOD measurements are taken by different measuring devices situated at different points, and the location of the target device is calculated from these simultaneous measurements.

In an active location scheme, the TOD may be measured for a packet that is transmitted from the measuring station addressed to the target station. The TOA of the response from the target station at the measuring station is then also measured. If the turnaround time for the target station to receive the packet from the measuring station and to start to transmit the response is known, or is known to be a constant, then the time difference at the measuring station between the TOA and the TOD, minus the turnaround time at the target station will be directly proportional to twice the distance of the target station from the measuring station. For example, if the target station is a wireless device based upon IEEE 802.11 technology, and if the packet transmitted from the measuring station to the target station is a data packet, the response from the target station will normally be an acknowledgement (ACK) packet. If the packet transmitted from the measuring station to the target station is a control packet, for example a request-to-send (RTS) packet, then the response from the target station will normally be a clear-to-send (CTS) packet. In these two examples, the turnaround time at the target station is defined in the IEEE 802.11 standard as the short interframe spacing (SIFS), which is a preset value. Hence, the time delay, td, between the measuring station and the target station, may be determined from the calculation td=(TOA−TOD−SIFS)/2 and the distance between the measuring station and the target station is then td*c, where c is the speed of light. This method of estimating the distance to a target station by measuring the TOD and TOA and accounting for the turnaround time is known.

FIG. 1 is a diagram of a typical location system 100 which includes three measuring stations 110a, 110b and 110c (referred to collectively herein as "measuring stations" or "measuring receivers" 110). The target station 120 may be a wireless device, such as, for example, an Access Point (AP) that is to be located by the three airborne measuring stations 110. The distance of the target station 120 from measuring station 110a is D1, 130. The distance of the target station 120 from measuring station 110b is D2, 140. The distance of the target station 120 from measuring station 110c is D3, 150. The round trip time, RTT1, determined from the calculation RTT=(TOA−TOD−SIFS), is measured for transmissions from measuring station 110a and this can used to calculate the distance D1 130 using the formula D1=RTT1*2c where c is the speed of light. Similarly, RTT2 and RTT3 measurements result in the determination of distances D2 140 and D3 150. The methods for calculating the location of target station 120 using the distances D1 130, D2 140 and D3 150 are well known.

FIG. 2 is a diagram of an airborne measuring station 110 actively geo-locating target stations 120a, 120b, 120c and 120d. The target station 120a depicts the example of an outdoor device, target station 120b depicts the example of a device inside a residential home, target station 120c depicts the example of a device inside an automobile, and target station 120d depicts the example of an apartment. The obstruction losses for each of the target stations 120a, 120b, 120c and 120d will differ and hence the maximum range at which the airborne measuring station 110 can successfully geo-locate the target stations will differ because the radio frequency (RF) obstruction losses will vary between the target stations. From the airborne measuring station's 110 perspective, the range will be dependent upon two factors: the transmit power of the ranging packet, which should be such that the target station will successfully receive it, and the receive sensitivity of the airborne measuring station 110 which would be such that the response packet is received successfully. Transmitting the ranging packet at a sufficiently high power is straightforward, e.g., by using a higher power amplifier and/or higher gain antenna, but the receive sensitivity of the airborne measuring station 110 is generally restricted to the noise figure of the receiver.

The signal level, Pr, received at the airborne measuring station 110 is:

$$Pr = Pt + G_1 + G_2 - L_{fs} - Lo \quad (5)$$

Where
Pt=Transmit power from the target station 120
$G_1$=Antenna gain at the airborne measuring station
$G_2$=Antenna gain at the target station
$L_{fs}$=Propagation loss, free space
Lo=Obstruction loss The obstruction loss, Lo, for the path from the target station 120a and the airborne measuring station 110 can be assumed to be zero as the target station 120a has a line-of-sight path to the airborne measuring station 110. In contrast, the obstruction losses for the other target stations may, for example, be on the order of 10 dB for target station 120b, 6 dB for target station 120c and 15-20 dB for target station 120d. The range of the airborne measuring station 110 to successfully detect the response packets from each of these target stations is limited due to the fixed sensitivity of the airborne measuring station 110 which is restricted by the noise figure of the receiver and the need to receive a packet without errors.

SUMMARY

A method, wireless device and airborne station for the geo-location of wireless local area network (WLAN) devices are disclosed that achieve improved sensitivity and range compared to known methods.

According to one aspect, a method in a first wireless device (WD) includes transmitting a plurality of ranging signals in a burst of N transmissions, with a time Tp between each transmission, and with a wait time Tw between each burst, and recording times of transmission for each of the ranging signals in a burst. The method further includes setting a duration and start and end times of a reception window that starts at time Ts after the transmission of each ranging signal and ends at time Tt after the transmission of each ranging signal. The method further includes receiving direct sequence spread spectrum (DSSS) response signals transmitted from a second WD, each DSS response signal being in response to one of the plurality of ranging signals. The method further includes demodulating and de-spreading each of the received DSSS response signals to produce a received sequence of bits. The method also includes determining an expected sequence of bits for the received response signals and correlating the received sequence of bits with the expected sequence of bits to determine a correlation value. The correlation value is indicative of an extent to which the received sequence matches the expected sequence. The method also includes recording a plurality of correlation values for a duration of a reception window for each of the plurality of ranging signal transmissions. Further, the method includes calculating a rolling maximum value, M, of the recorded correlation values for the duration of the reception window for each of the plurality of ranging signal transmissions. The method also includes detecting a completion of a burst of ranging signals, calculating a sum of the rolling maximums, determining a peak value of the sum of the rolling maximums, and recording a time of the peak value referenced to an end of the plurality of ranging signal transmissions. The method also includes determining a geo-location of the second WD based at least in part on a time of transmission of a ranging signal and the time of the peak value of the sum of the rolling maximums.

According to this aspect, in some embodiments, each transmitted ranging signal is one of a request-to-send, RTS, signal and a data null signal. In some embodiments, the method further includes determining parameters of the plurality of ranging signals by one of selecting a WD receiver address (RA) to be used as a medium access control (MAC) address of the second WD, selecting a MAC address to be used as a wireless transmitter address (TA) and selecting a duration value for the duration of the reception window. In some embodiments, the determination of the expected sequence of bits includes: constructing medium access control (MAC) header bits based on using a transmitter address (TA) of the ranging signal as a receiver address (RA) of the DSSS response signal; adding preamble and header bits to the MAC header bits to produce a packet; and scrambling the packet using a predetermined seed to produce the bits of the expected sequence. In some embodiments, the rolling maximum value M is defined as: for k=0 to (W−s), $$M_{k+\frac{s}{2}} = \max\{C\}_k^{k+s},$$

where W=number of samples in the reception window, C are correlator values, s=number of samples in the assumed maximum jitter of the response packet, and $$\max\{C\}_k^{k+s}$$

is a maximum correlation value between k and k+s. In some embodiments, the method further includes applying soft bit detection of the received DSSS response signals.

According to another aspect, a first wireless device (WD) includes a transmitter and processing circuitry and a correlator. The transmitter is configured to transmit a plurality of ranging signals in a burst of N transmissions, with a time Tp between each transmission, and a wait time Tw between each burst. The processing circuitry is in communication with the transmitter. The processing circuitry is configured to: record a time of each transmission; receive a plurality of direct sequence spread spectrum (DSSS) response signals, each DSSS response signal being responsive to a different one of the plurality of ranging signals; demodulate and de-spread each of the plurality of received DSSS response signals to produce a received sequence of bits and determine an expected sequence of bits for the received DSSS response signals. The correlator is in communication with the processing circuitry and is configured to: correlate the bits of the received sequence with the bits of the expected sequence to determine a correlation value, the correlation value being indicative of an extent to which the received sequence matches the expected sequence; and record the correlation values for a duration of a reception window for each of the plurality of ranging signal transmissions. The processing circuitry is further configured to: calculate a rolling maximum value, M, of the recorded correlation values for the duration of the reception window for each of the plurality of ranging signal transmissions; detect a completion of a burst of ranging signals; calculate a sum of the rolling maximums; determine a peak value of the sum of the rolling maximums; and record a time of the peak value referenced to an end of the plurality of ranging signal transmissions. The processing circuitry is further configured to determine a geo-location of the second WD based at least in part on a time of transmission of a ranging signal and the time of the peak value of the sum of the rolling maximums.

According to this aspect, in some embodiments, each transmitted ranging signal is one of a request-to-send, RTS, signal and a data null signal. In some embodiments, the processing circuitry is further configured to determine parameters of the plurality of ranging signal by one of selecting a WD receiver address (RA) to be used as a medium access control (MAC) address of the second WD, selecting a MAC address to be used as a wireless transmitter address (TA) and selecting a duration value for the duration of the reception window. In some embodiments, the determination of the expected sequence of bits includes: constructing medium access control (MAC) header bits based on using a transmitter address (TA) of the ranging signal as a receiver address (RA) of the DSSS response signal; adding preamble and header bits to the MAC header bits to produce a packet; and scrambling the packet using a predetermined seed to produce the bits of the expected sequence. In some embodiments, the rolling maximum value M is defined as: for k=0 to (W−s), $$M_{k+\frac{s}{2}} = \max\{C\}_k^{k+s},$$

where W=number of samples in the reception window, C are correlator values, s=number of samples in the assumed maximum jitter of the response packet, and $\max\{C\}_k^{k+s}$ is a maximum correlation value between k and k+s. In some embodiments, the processing circuitry is further configured to apply soft bit detection of the received DSSS response signals.

According to yet another aspect, an airborne station includes a transmitter configured to transmit a plurality of ranging signals in a burst of N transmissions, with a time Tp between each transmission, and a wait time Tw between each burst, a ranging signal being one of a request-to-send, RTS, signal and a data null signal. The transmitter is further configured to record the time of each transmission. A receiver is configured to receive a direct sequence spread spectrum, DSSS, response signal from a ground station. The DSSS response signal is spread by an 11 bit barker code and each DSSS response signal is responsive to a different one of the plurality of ranging signals. The airborne station also includes processing circuitry in communication with the transmitter and receiver. The processing circuitry is configured to: demodulate and de-spread each of the received DSSS response signals to produce a received sequence of bits and obtain an expected sequence of bits for the received response signals. The airborne station includes a correlator in communication with the processing circuitry. The correlator is configured to correlate the bits of the received sequence with bits of the expected sequence to determine a correlation value, the correlation value being indicative of an extent to which the received sequence matches the expected sequence. The correlation values are recorded for a duration of a reception window for each of the plurality of ranging signal transmissions. The processing circuitry is further configured to calculate a rolling maximum value, M, of the correlation values for the duration of the reception window for each of the plurality of ranging signal transmissions. Further, the processing circuitry is configured to detect a completion of a burst of ranging signals; calculate a sum of the rolling maximums; determine a peak value of the sum of the rolling maximums; record a time of the peak value referenced to an end of the ranging signal transmissions; and determine a geo-location of the second WD based at least in part on a time of transmission of a ranging signal and the time of the peak value of the sum of the rolling maximums.

According to another aspect, an airborne station includes a transmitter configured to: transmit a plurality of ranging signals in a burst of N transmissions. A receiver is configured to receive, for each ranging signal in the burst, a response signal from a ground station; and extract from each response signal a received sequence of bits. The receiver is further configured to correlate bits of the received sequence with bits of an expected sequence to determine a correlation value, the correlation value being indicative of an extent to which the received sequence matches the expected sequence. The airborne station includes processing circuitry in communication with the transmitter and receiver. The processing circuitry is configured to: calculate rolling maximum values M of correlation values determined for a reception window during which spread spectrum signals are received; calculate a sum of the calculated rolling maximum values M; and determine a peak value of the calculated sum. The processing circuitry is also configured to determine a geo-location of the ground station based at least in part on a time of transmission of a ranging signal and a time of occurrence of the peak value referenced to an end of the plurality of ranging signal transmissions.

According to this aspect, in some embodiments, the response signal is a direct sequence spread spectrum signal (DSSS) and the extracting includes despreading. In some embodiments, the rolling maximum value M is defined as: for k=0 to $$(\text{W}-\text{s}), M_{k+\frac{s}{2}} = \max\{C\}_k^{k+s}$$

where W=number of samples in the reception window, C are correlator values, s=number of samples in the assumed maximum jitter of the response packet, and $$\max\{C\}_k^{k+s}$$

is a maximum correlation value between k and k+s. In some embodiments, the processing circuitry is further configured to set a duration of the reception window based on an assumed short interframe spacing (SIFS) jitter. In some embodiments, the rolling maximum values M are calculated over a duration equal to an expected short interframe spacing (SIFS) jitter. In some embodiments, the expected sequence of bits are determined by steps that include: constructing medium access control (MAC) header bits based on using a transmitter address (TA) of the ranging signal as a receiver address (RA) of the response signal; adding preamble and header bits to the MAC header bits to produce a packet; and scrambling the packet using a predetermined seed to produce the bits of the expected sequence. In some embodiments, the processing circuitry is further configured to detect a completion of a burst of ranging signals.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein:

FIG. 21 is a flow diagram of a process for achieving greater sensitivity and range for wireless geo-location as compared with known methods; and FIG. 22 is a continuation of the flow diagram of FIG. 21.

DETAILED DESCRIPTION

This Application incorporates U.S. patent application Ser. No. 16/589,627 by reference in its entirety. As an initial matter, it is noted that improving the effective sensitivity of the measuring receiver as compared with known arrangements will increase the range at which target stations 120 may be detected and located as compared to known methods. In one embodiment of the present disclosure, a single airborne measuring station 110 is used. The present disclosure provides methods and devices that increase the range of active geo-location from the airborne measuring station 110 as compared to known methods. In some embodiments, the disclosed method applies to the reception of direct sequence spread spectrum (DSSS) acknowledgement (ACK) and clear-to-send (CTS) packets in response to data null and request-to-send (RTS) packets respectively, in the 2.4 GHz band.

Figure 1:
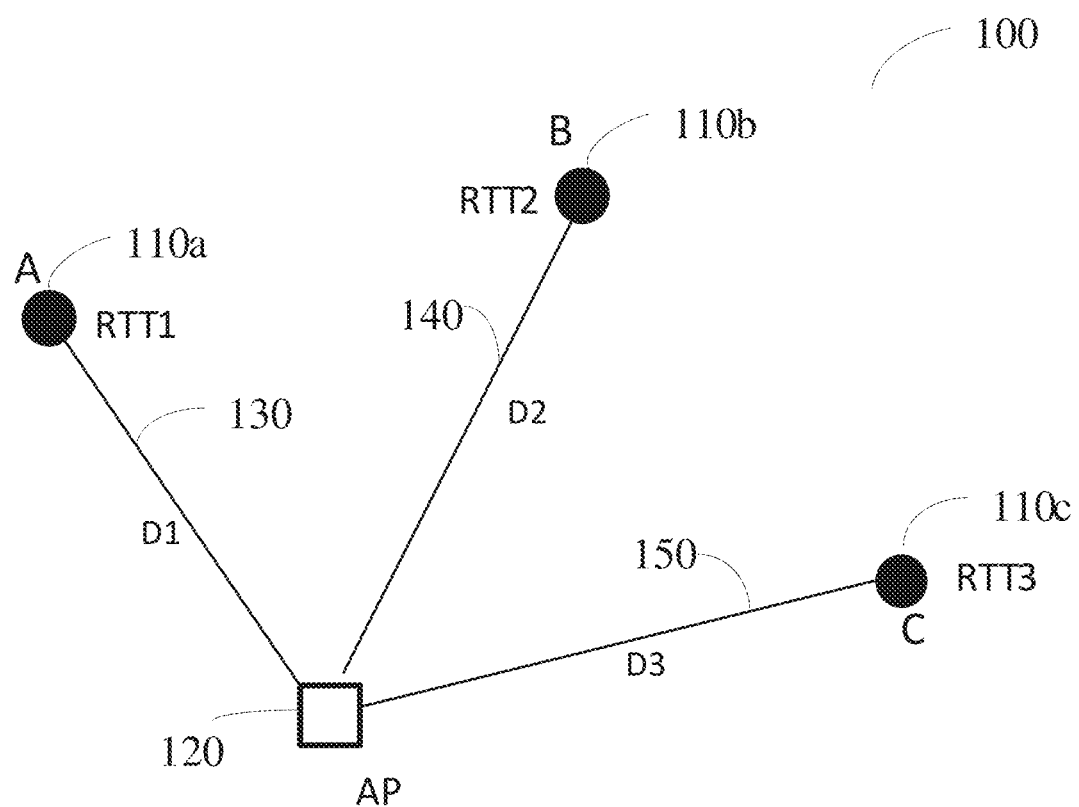
FIG. 1 is a diagram of a typical location system which includes three measuring stations.
Figure 2:
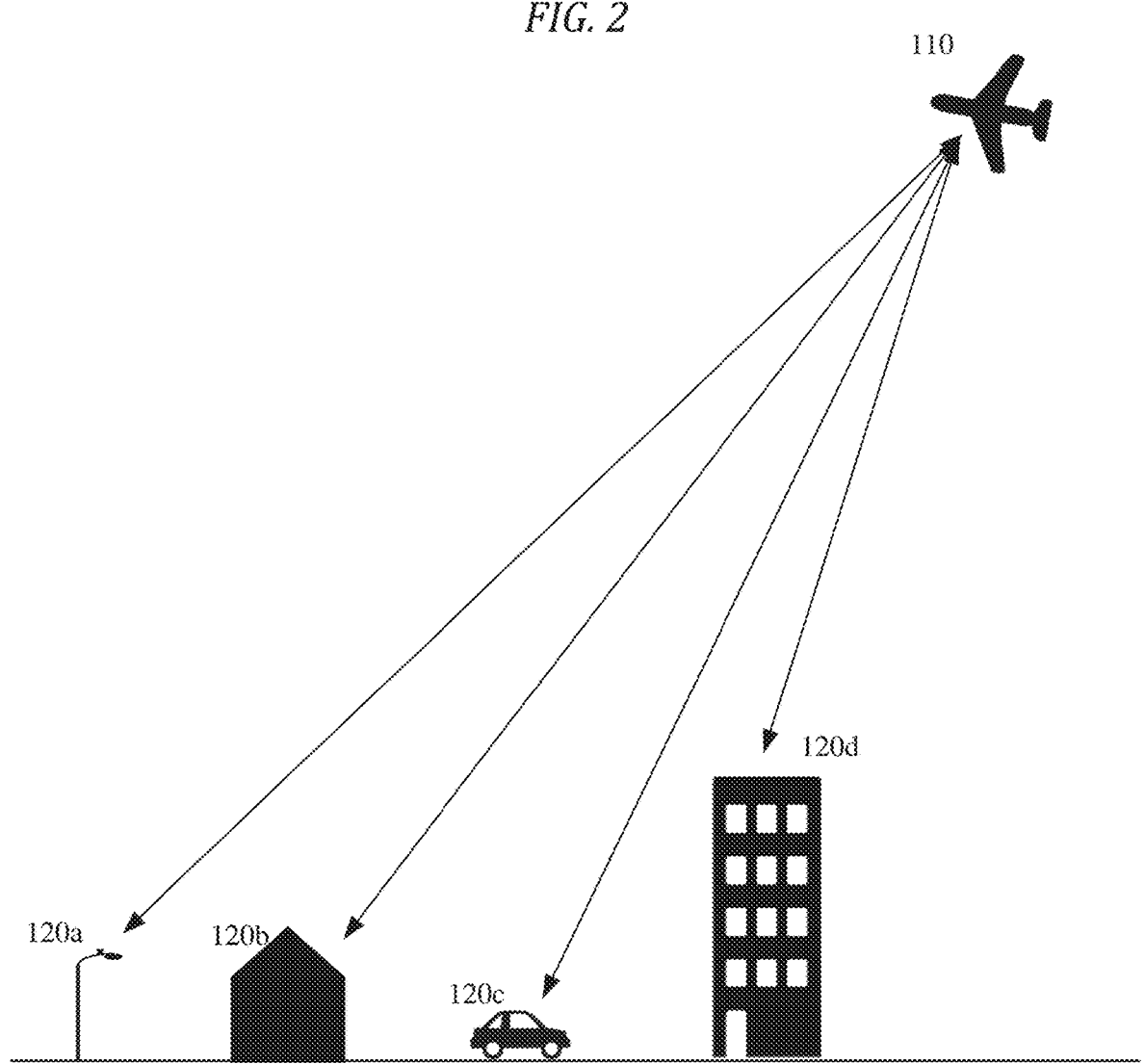
FIG. 2 is a diagram of an airborne measuring station actively geo-locating target stations.
Figure 3:
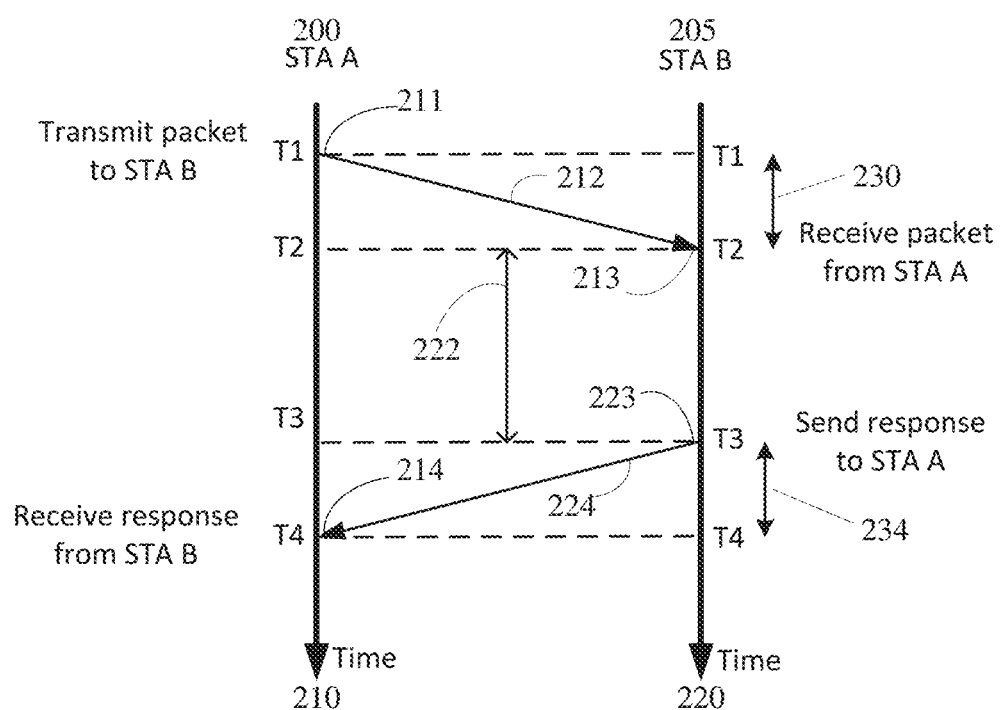
FIG. 3 is a timing diagram that describes the ranging method of the present disclosure that may be used to determine the distance between two wireless devices.

Referring again to the drawing figures, there is shown in FIG. 3 a timing diagram that describes a ranging method of the present disclosure that may be used to determine the distance between two wireless devices, such as wireless device STA A 200 and wireless device STA B 205. In one embodiment, one of the wireless devices (i.e., one of STA A 200 and STA B 205) may be target station 120. In another embodiment, at least one of wireless devices (i.e., at least one of STA A 200 and STA B 205) is an airborne measuring station 110. Time axis 210 refers to the time axis for STA A 200 and time axis 220 refers to the time axis for STA B 205. At time T1 211, STA A 200 transmits a packet to STA B 205. This ranging packet 212 transmission is received at STA B 205 at time T2 213. The propagation time of the ranging packet 212 transmission is (T2−T1) 230. STA B 205 transmits a response packet 224 at time T3 223. The time 222 that has elapsed between the reception of the packet at time T2 213 and the transmission at time T3 223 is the turnaround time at STA B 205. Ideally the turnaround time 222 at STA B will be equal in duration to SIFS. At time T4 214, STA A 200 receives the response packet 224 from STA B 205. The propagation time of the transmission of the response packet 224 is (T4−T3) 234. It should be noted that the time differences 230 (T2−T1) and 234 (T4−T3) represent the propagation time, td, of the transmissions and should be equal assuming the distance between the two stations has not changed. The total time that elapses between the transmission of ranging packet 212 and the response packet 224 at STA A 200 is $$(T2-T1)+(T3-T2)+(T4-T3)=(T4-T1)=td+\text{SIFS}+td \quad (1)$$

Hence, $td=(T4-T1-\text{SIFS})/2$ \quad (2)

Equation (2) is a simplified equation that is included so as to provide the basic idea of the ranging transmission method. Note that the duration of the transmitted packet and the response packet is not accounted for in equation (2). Note that in practice it is common that the timestamp of a packet is set to coincide with the end of the packet at the point where the frame check is completed.

Figure 4:
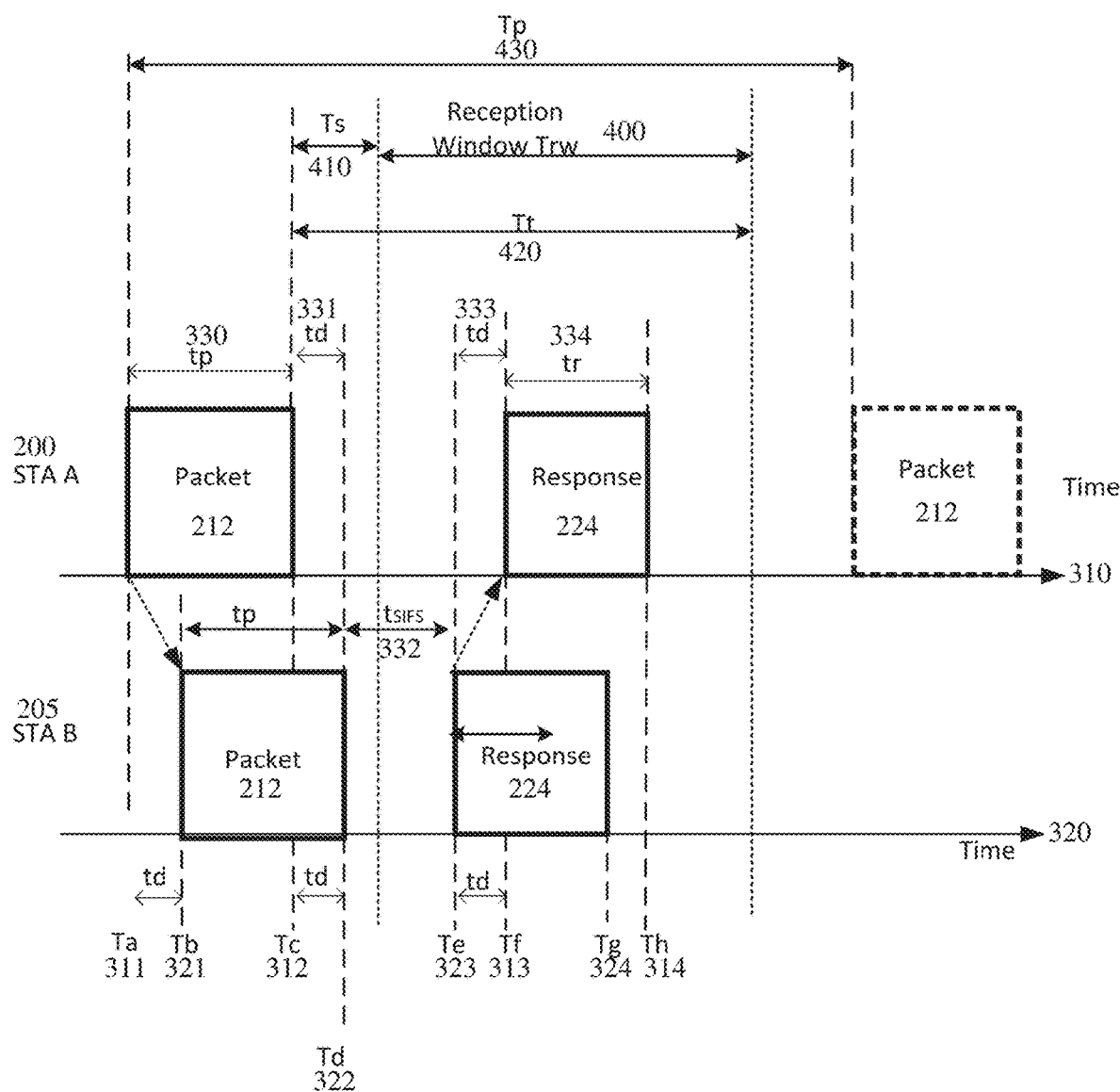
FIG. 4 is a timing diagram that describes in further detail the ranging transmission method.

FIG. 4 is a timing diagram that describes in further detail the ranging transmission method. Time axis 310 is the time axis for STA A 200 and time axis 320 is the time axis for STA B 205. At time Ta 311, STA A 200 starts the transmission of ranging packet 212 which is addressed to STA B 205. After a time-delay of td, at time Tb 321, STA B 205 starts to receive ranging packet 212. At time Tc 312, STA A 200 completes the transmission of ranging packet 212 and at time Td 322, STA B 205 completes the reception of ranging packet 212. The time difference between Tc 312 and Td 322 is td, the propagation time for the packet to travel from STA A 200 to STA B 205. Note that the time differences (Tc−Ta) and (Td−Tb) are both the duration tp 330 of the transmitted ranging packet 212.

STA B 205 transmits the response packet 224 at time Te 323. Assuming that the response packet 224 is an ACK or an RTS packet in reply to the received ranging packet 212, time Te 323 ideally will be at a time $t_{SIFS}$ 332 after time Td 322, where $t_{SIFS}$ 332 is the SIFS time as defined in the IEEE 802.11 standard. At time Tf 313, STA A 200 starts to receive the response packet 224. At time Tg 324, STA B 205 completes the transmission of the response packet 224 and at time Th 314, STA A 200 completes receiving the response packet 224. Note that the time differences (Tb−Ta), (Td−Tc), (Tf−Te) and (Th−Tg) are all equal and have the value td which is the propagation time for the packet and response to travel between the two STAs.

At STA A 200, the time of a packet at the point when the frame check has completed, may be recorded. Hence, if STA A 200, is the measuring station, the time for the transmission of ranging packet 212 that is recorded is Tc 312, and the time that is recorded for the reception of the response packet 224 is Th 314. In order to calculate the value of td, it is desirable to know the duration tr 334 of the response packet 224. Calculating the duration tr 334 is straightforward as the measuring station STA A 200 can monitor the details of the response packet such as data rate and length. In practice therefore, STA A 200 can calculate the value of td from expression (3):

$$td=(Th-Td-tr-t_{SIFS})/2 \quad (3)$$

and hence the corresponding distance, $D=d*c$ \quad (4)

Stated another way, STA A 200 begins transmission of ranging packet 212 at a beginning transmission time Ta 311 and ends transmission of the ranging packet 212 at an ending transmission time Tc 312. STA B 205 begins receiving of the first ranging packet 212 at a beginning reception time Tb 321 and receives the complete first ranging packet 212 at an ending reception time Td 322, wherein td is measured as the time between the ending transmission time Tc 312 and the ending reception time Td 322.

A reception window Trw 400 may be defined which may be related to the range of the target, STA B 205. The reception window starts at time Ts 410 after the end of the transmission, Tc 312 of ranging packet 212 and ends at time Tt 420 after the end of the transmission, Tc 312 of ranging packet 212. As an example, consider the case where the target STA B 205 is known to be at a range of, for example, 2 to 5 miles from STA A 200. In this example, the reception window Trw may be set to start at time Ts 410, 21 μs after time Tc 312, and end at time Tt 420, 53 μs after time Tc 312. In this example the duration of the reception window Trw 400 is 32 μs.

Figure 5:
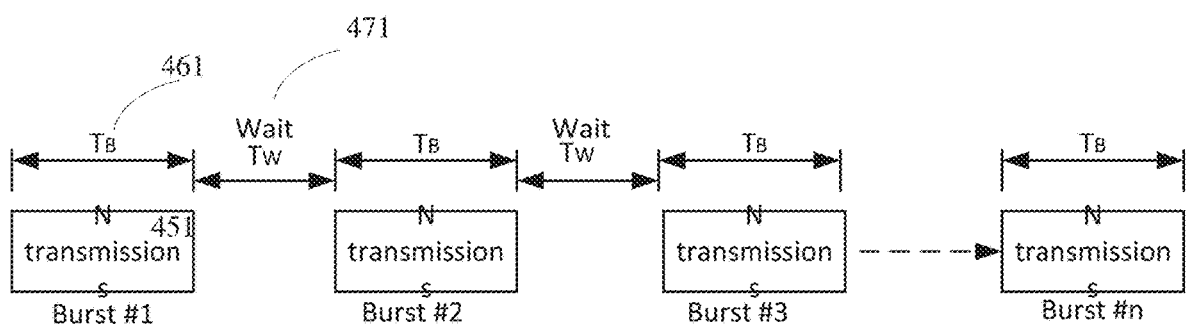
FIG. 5 is a timing diagram of a series of bursts of transmissions of the ranging packets.

FIG. 5 is a timing diagram of a series of bursts of transmissions of the ranging packets 212. In one embodiment of this disclosure, a "burst", 451, consisting of a preset number N of transmissions of packets 212 from STA A 200, may be sent followed by a "wait" period, 471. This sequence may continue until a command may be issued to terminate the transmissions. Within each burst, each of the N transmissions may be separated by a preset time, Tp 430. The duration TB of each burst will therefore be N Tp. For example, a burst may consist of 30 transmissions of packets 212 from STA A 200, each transmission, say, 1 ms apart, followed by a wait period of, say, 20 ms after which another burst of 30 transmissions may be sent. In this example the duration of each burst will be 30 ms.

In the case that there is a single airborne measuring station 110, as may be the case when the station is airborne, then the three measuring distances D1 130, D2 140 and D3 150 will be taken at different points in time. In this case the airborne measuring station 110 may be flying over an area and periodically transmitting the packets 212, receiving the response packets 224 and calculating the delay time td. Over time, the location of target station 120 can be calculated with increasing accuracy as more measurements are taken by the airborne measuring station 110 from varying positions. Such calculations are well known.

As mentioned previously, the packet exchange may be any pair of packets where an automatic response packet is sent. Commonly used packets in Wi-Fi include an RTS/CTS exchange and a Data (null)/Ack exchange.

In one embodiment of the present disclosure, a single airborne measuring station 110 is used. A method and devices are disclosed that increase the range of active geo-location from the airborne measuring station 110 as compared with prior methods and systems by increasing the effective receive sensitivity of the airborne measuring station 110. In some embodiments, the disclosed method applies to the reception of direct sequence spread spectrum DSSS ACK and CTS packets in response to data null and RTS packets respectively, in the 2.4 GHz band.

In one non-limiting embodiment used to describe the functions and concepts herein, a DSSS CTS and a DSSS ACK packet, consist of 304 bits:
128 scrambled 1s;
16 bit SFD (start of frame delimiter);
48 bit header;
14 Bytes payload;
2 Byte Frame Control;
2 Byte Duration field;
6 byte Receiver Address (RA);
4 Byte Frame Check Sum (FCS).

A 1 Mbps DSSS packet uses an 11 bit Barker code to spread the signal. Each bit is represented by the 11 bit code either as is, for a 1, or inverted for a 0. Hence there is a processing gain (PG) of approximately 10 dB (PG=10 log 11). The modulation is binary phase shift keying BPSK.

The probability of a bit error, Pb, for BPSK, is $$Pb = 0.5 \text{ erfc} \sqrt{E_b/N_0} \qquad (6)$$

Where
"erfc" is the Gauss complimentary error function
$E_b$ is energy per bit
$N_0$ is noise per hertz
For BPSK, $$E_b/N_0$$

is equal to the signal to noise ratio, SNR.
The packet error rate, PER, is related to the bit error, Pb by the expression $$PER = 1-(1-Pb)^N, \qquad (7)$$

Where N is the number of bits in the packet
For a packet error rate PER=0.7, with N=304,
from equations (6) and (7) Pb=0.00386 and Eb/No=SNR=5.5 dB.
With the 10 dB processing gain (11 bit Barker code), this is equivalent to an input SNR=−4.5 dB.
The received signal level is calculated using the standard formula:

$$Pr = 10 \log(1000K\ T) + 10 \text{ Log } BW + NF + SNR \text{ dBm} \qquad (8)$$

Where
K is Boltzmann's constant
T is temperature in degrees Kelvin
BW is the occupied bandwidth, Hz
NF is the noise figure, dB
For T=20° Celsius, 10 log (1000 K T)=−174 dBm
BW=20 MHz for DSSS and assuming NF=3 dB and SNR=−4.5 dB, from (8)
Pr=−102.5 dBm.

A receiver sensitivity of −102.5 dBm for a 70% packet error rate (PER) represents an ideal situation with no implementation losses.

Now, for example, consider a signal 10 dB lower, i.e., Pr=−112.5 dBm. In this case, the input SNR=−14.5 dB but, after 10 dB processing gain, the effective SNR is −4.5 dB. From equation (6) the bit error Pb=0.2. Hence, 80% of the detected bits are correct, or, of the 304 bits in the CTS or ACK packet, 243 bits are correct. Note that the PER, from equation (7) is 100% and the detected packet would fail the FCS and hence normally the packet would be discarded.

If, as per this example of Pb=0.2, 243 bits of the total 304 bits of the expected CTS or ACK are correct then it might quite safely be assumed that the packet was indeed the CTS or ACK that was expected. Hence, if all the bits of the CTS or ACK are known in advance, then the received bits may be compared to the expected bits and a decision taken as to whether the CTS or ACK had indeed been received. This technique is known as correlation where the decision is based upon a correlation threshold.

In the general sense, correlation works by passing the known pattern across the noisy pattern, and if the bits agree, they add, if not the bits subtract.

For a packet of N bits, N Pb bits will not match and N (1−Pb) will match,

Hence Correlation %=100(Match−Mismatch)/Total or Correlation %=100(N−2NPb)/N=100(1−2Pb)        (9)

Hence, for Pb=0.2, Correlation %=100 (1−2×0.2)=60%
Note that for pure noise, Pb=0.5 and hence 152 bits will agree (match), 152 will not agree (mismatch) and correlation will be 0%.

If the raw detected 304 bits of the DSSS CTS or DSSS ACK packets are correlated across the known bits of the complete packet, then it is possible to detect a CTS or ACK packet that is well below the noise level.

For a given SNR, the bit error Pb may be calculated using equation (6) and the correlation % calculated using equation (9). Assuming a binomial distribution, the variance and standard deviation σ for the correlation % may be calculated:

$$\sigma^2 = NPb(1-Pb)$$

$$\sigma = \sqrt{NPb(1-Pb)} \qquad (10)$$

Figure 6:
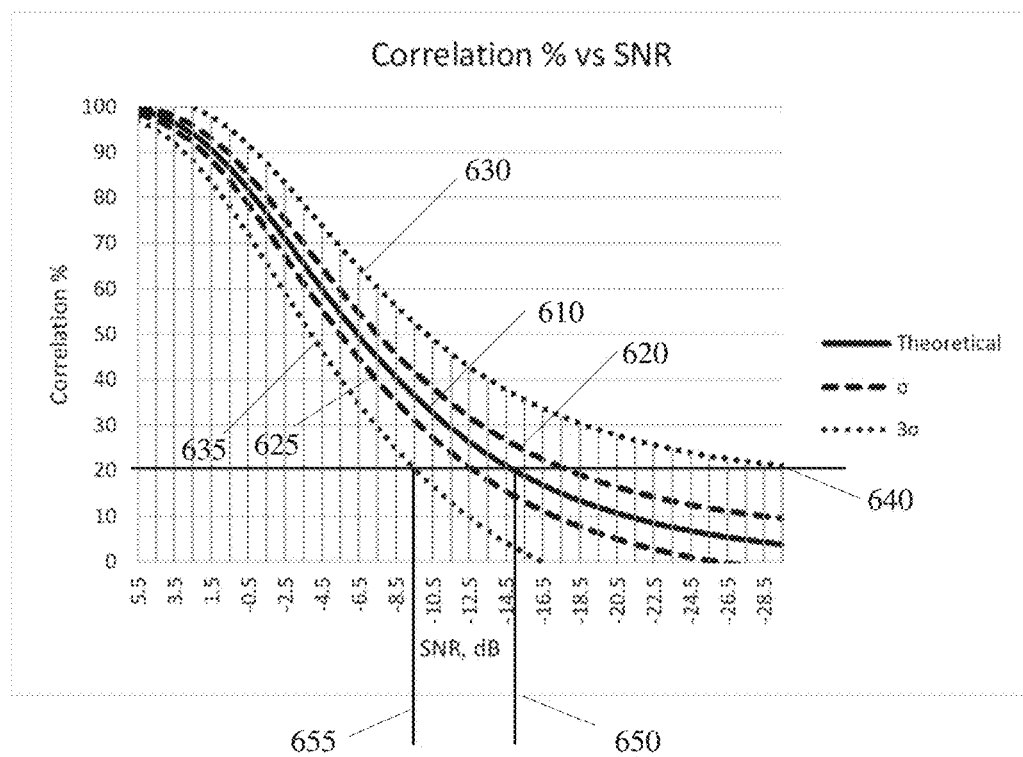
FIG. 6 is a graph of Correlation % versus received signal power Pr for 304 bits.

FIG. 6 is a graph of Correlation % versus SNR for 304 bits. The theoretical correlation 610 is calculated using equation (9). Also plotted are the standard deviations, +σ and −σ, 620 and 625 respectively. There is a 97.7% probability that the result is within the range +3σ and −3σ, and these values are plotted 630 and 635 respectively. For SNR=−29 dB and less, the input is close to pure noise. From the 3σ curve 630, for SNR=−29 dB, the correlation is in the order of 20% 640. Hence, there is a 0.3% probability that noise will result in a correlation of 20%. Or, if the correlation threshold is set at 20%, there is a 99.7% probability that the CTS or ACK will be correctly detected. From the −3σ curve 635 this corresponds to an SNR of about −9.5 dB 655. Hence, theoretically, selecting a correlation threshold of 20% should result in greater than 97.7% detection of packets of 304 bits for an SNR of −9.5 dB.

Figure 7:
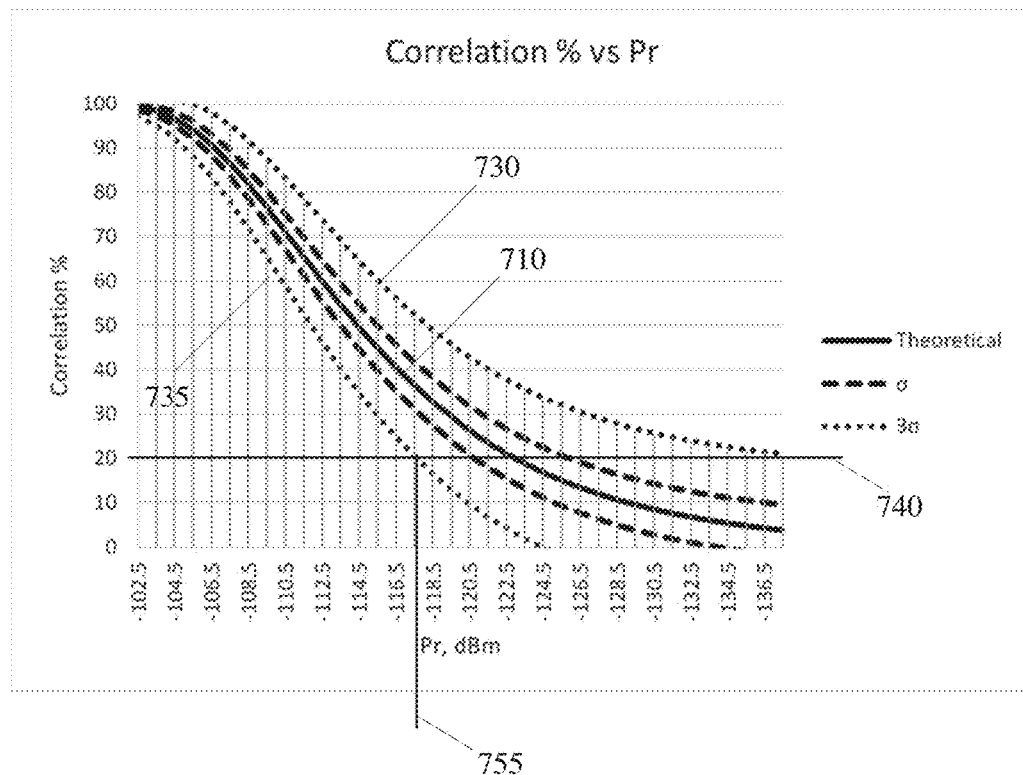
FIG. 7 is a graph of Correlation % versus received signal power Pr for 304 bits.

FIG. 7 is a graph of Correlation % versus received signal power Pr for 304 bits. FIG. 7 is similar to FIG. 6 but the received signal strength Pr, as calculated using equation (8) assuming a noise figure of 3 dB, is shown as the horizontal axis in place of SNR. The theoretical correlation 710 is calculated using equation (9). There is a 97.7% probability that the result is within the range +3σ and −3σ, and these values are plotted 730 and 735 respectively. For receive signal levels less than −137 dBm, there is a 0.3% probability that noise will result in a correlation of 20%, 740. 20% correlation 740 relates to a signal level of about −117.5 dBm, 755. Hence, theoretically, selecting a correlation threshold of between 20% and 30% should result in greater than 97.7% detection of packets of 304 bits, which corresponds to an input signal level in the order of −117 dBm.

In order for the correlation to be effective the complete raw bit stream of the response packet 224 should be known. In the cases where this response packet 224 is either a DSSS CTS or a DSSS ACK, then the packet may comprise 304 bits.

Figure 8:
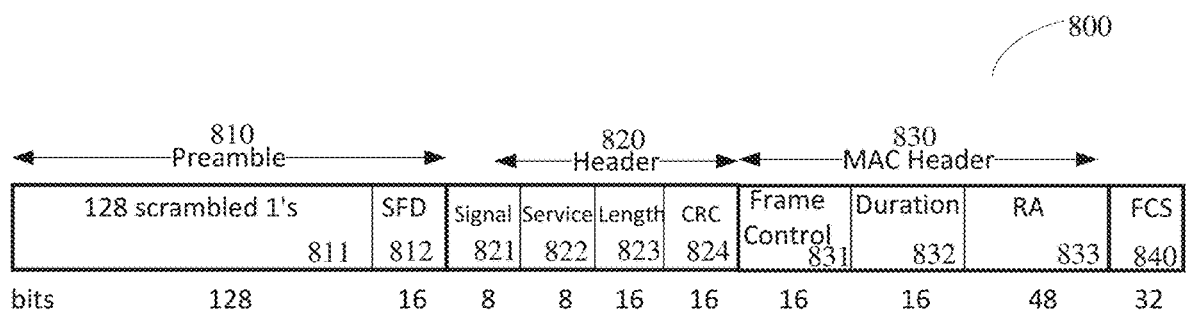
FIG. 8 is a diagram of the frame format 800 of a 1 Mbps DSSS CTS or DSSS ACK.

FIG. 8 is a diagram of the frame format 800 of a 1 Mbps DSSS CTS or DSSS ACK. The packet starts with the Preamble 810 which comprises 128 scrambled 1's 811 and a start of frame delimiter SFD field 812. The Preamble 810 is followed by the Header 820 which comprises four fields: Signal 821, Service 822, Length 823 and CRC 824. The Header 820 is followed by the MAC Header 830 which comprises three fields: Frame Control 831, Duration 832 and receiver address (RA) 833. The packet ends with the frame check sum (FCS) 840.

Figure 9:
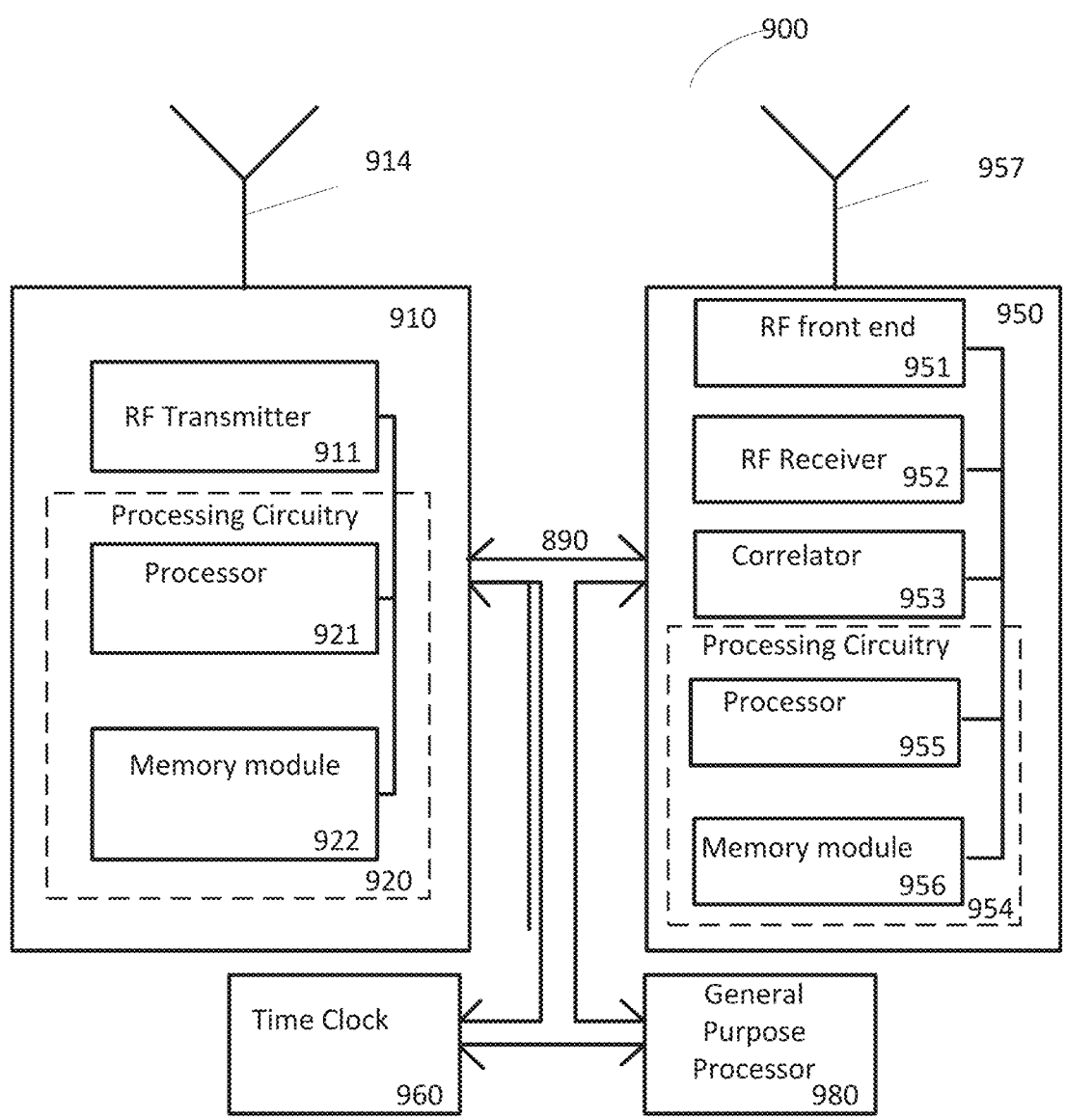
FIG. 9 illustrates a block diagram of an example wireless communication device.

FIG. 9 illustrates a block diagram of an example wireless communication device 900 which, according to an embodiment of the disclosure, may be used as or as part of the airborne measuring station 110. In one embodiment, at least one of wireless devices STA A 200 and STA B 205 is an airborne measuring station 110.

The wireless communication device 900 may be any device capable of wirelessly receiving signals and transmitting signals and may be configured to execute any of the methods of the IEEE 802.11—2016 Standard. Wireless communication device 900 may be one or more stations or access points, and the like. Wireless communication device 900 may be one or more wireless devices that are based upon the IEEE 802.11 specification and each may be configured to act as a transmitter or a receiver. The embodiment described herein is that where wireless communication device 900 includes a wireless transmitter 910 and a wireless receiver 950. The wireless communication device 900 may also include a time clock 960 and a general purpose processor 980 which are interconnected to the wireless transmitter 910 and the wireless receiver 950 by a data bus 990.

In some embodiments, the wireless transmitter 910 includes an RF transmitter 911 and processing circuitry 920 that includes processor 921, and memory module 922. The wireless transmitter 910 also includes one or more wireless antennas such as wireless antenna 914. The RF transmitter 911 may perform the functions of spreading, and DSSS modulation, as described in IEEE 802.11—2106, and amplification for the transmission of the DSSS packets via the antenna 914. In some embodiments the processing circuitry 920 and/or the processor 921 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments the functions of the RF transmitter 911 may be performed by the processing circuitry 920. The processing circuitry 920 may be configured to control any of the methods and/or processes described herein and/or to cause such methods, and/or processes to be performed, e.g., by the RF transmitter 911. The memory module 922 may be configured to store data, programmatic software code and/or other information described herein. In some embodiments, the software may include instructions that, when executed by the processing circuitry 920, causes the processing circuitry 920 to perform the processes described herein with respect to the wireless transmitter 910.

In some embodiments, the wireless receiver 950 includes an RF front end 951, an RF receiver 952, a correlator 953, processing circuitry 954 (that includes a processor 955 and a memory module 956) and one or more wireless antennas such as wireless antenna 957. The RF front end 951 may perform the usual functions of an RF receiver front end such as low noise amplification, filtering and frequency down conversion so as to condition the received signal suitable for inputting to the RF receiver 952. The RF receiver 952 may perform the functions of demodulation and de-spreading of the DSSS packet so as to condition the received signal suitable for inputting to the correlator 953. The correlator 953 performs the function of correlating the conditioned, demodulated received bits with the known bit pattern. In some embodiments the RF receiver 952 and/or the correlator 953 and/or the processing circuitry 954 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments the functions of the RF receiver 952 and/or the correlator 953 may be performed by the processing circuitry 954. The processing circuitry 954 may be configured to control any of the methods and/or processes described herein and/or to cause such methods, and/or processes to be performed, e.g., by the wireless receiver 950. The memory module 956 is configured to store data, programmatic software code and/or other information described herein. In some embodiments, the software may include instructions that, when executed by the processing circuitry 954, causes the processing circuitry 954 to perform the processes described herein with respect to the wireless receiver 950.

According to this embodiment of the disclosure, the wireless receiver 950 may be configured to measure and monitor an input signal's attribute, such as may include one or more of a ranging signal transmitted by wireless transmitter 910, data and control packets, and the response signal, including control packets, transmitted by an access point or station that may be based upon the IEEE 802.11—2016 Standard. Such packets may include data null, ACK, RTS and CTS packets. The memory module 956 may store instructions for executing any method mentioned in the IEEE 802.11—2016 Standard, input signals, and results of processing of the processor 955, signals to be outputted and the like.

According to an embodiment of the disclosure, the RF transmitter 911 may be configured to transmit signals and the processing circuitry 920 may be configured to prepare the transmitted signal attributes based upon the IEEE 802.11—2016 Standard. Such transmitted packets may include data packets, control packets and management packets that are to be transmitted by a wireless station that is based upon the IEEE 802.11. Such control packets may include RTS packets. The memory module 922 may store instructions for executing any method mentioned in the specification, input signals, and results of processing of the processor 921, signals to be outputted and the like.

According to another embodiment of the disclosure, the wireless receiver 950 may be configured to receive the transmissions of another target station 120 and the processing circuitry 954 may be configured to monitor an attribute of the transmissions of the other wireless communication device, and determine the value of the time of arrival of packets from the other wireless communication device. In addition, according to an embodiment of the disclosure the wireless receiver 950 may be configured to measure the times of departure of the transmissions from the wireless transmitter 910. These times may be accomplished by outputting a trigger that is timed to coincide with the reception packet from the other target station 120 or the wireless transmitter 910. This trigger may then be used to read the time from the time clock 960. Time clock 960 may have a precision that is higher than the internal timing synchronization function (TSF) timer that is part of the wireless receiver 950.

According to an embodiment of the disclosure, the wireless transmitter 910 may be configured to transmit bursts 451 of packets to another wireless communication device, as described in FIG. 5, and the processor 921 may be configured to prepare the attributes of the ranging packet 212 to be transmitted. Processor 921 may also be configured to set the timing Tp 430 between each ranging packet 212 transmission, the number N of ranging packet 212 transmissions within each burst, the wait time Tw 471 between bursts, as well as the start and stop times for the sequence of bursts.

According to an embodiment of the disclosure, a general purpose processor 980 may be used to control the operations of the wireless communication device 900 and in particular the wireless transmitter 910 and wireless receiver 950. The general purpose processor 980 may also carry out the various calculations as described in this disclosure and may also prepare the measurement results for disclosure to an operator or user. In some embodiments the general purpose processor 980 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions and may include a memory module to execute programmatic code stored in the general purpose processor or another device. It is also noted that the elements of the wireless communication device 900 can be included in a single physical device/housing or can be distributed among several different physical devices/housings.

Figure 10:
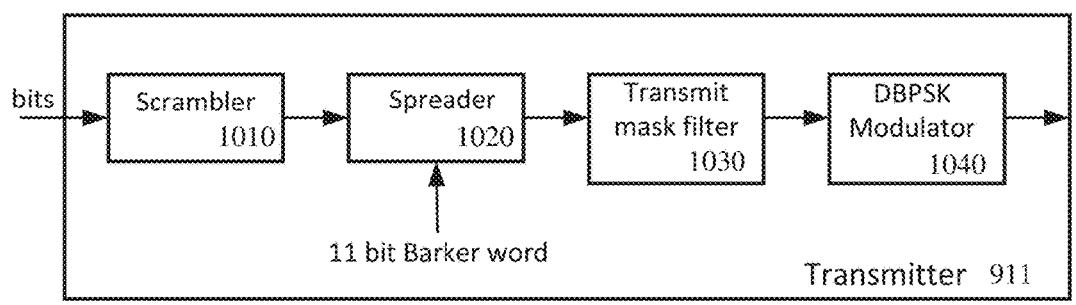
FIG. 10 is a functional block diagram of an example of a DSSS RF transmitter.

FIG. 10 is a functional block diagram of an example of a DSSS RF transmitter 911. The bits to be transmitted, as described in FIG. 7, are first past through a scrambler 1010. All information bits are scrambled by, for example, using a self-synchronizing 7-bit polynomial $G(z)=z^{-7}+z^{-4}+1$. The IEEE 802.11—2016 Standard allows for a random seed for the DSSS physical layer, Clause 15, but for the High Rate DSSS (HR/DSSS) physical layer, Clause 16, a fixed seed is defined. In practice the fixed seed is used by the vast majority of devices for both DSSS and HR/DSSS. The scrambled bits are then passed to the spreader block 1020 where the bits are spread with the 11 bit Barker code. The resulting spread spectrum signal is then filtered by a transmit mask filter 1030 and then modulated by differential binary phase shift keying (DBPSK) by the modulator block 1040.

Assuming that the scrambler seed is known, then all the raw scrambled bits in the CTS or ACK packet are known. Referring again to FIG. 8, the Preamble 810 and Header 820 bits are common for all CTS and ACK packets, and the Frame Control 831 bits will also be common for each CTS or ACK packet. The Duration field 832 is based upon the Duration field of the transmitted ranging packet 212 and hence can be set to a unique value. Also, the RA field 833 is set to the transmitter address (TA) field of the transmitted ranging packet 212 and hence will also be unique. The FCS field 840 will therefore be unique due to the uniqueness of the Duration and RA fields. Hence, in this example, of the 304 bits, up to 96 bits will be unique. A spurious received packet would therefore have 96 incorrect bits, equivalent to a correlation % of only 36%. The correlation is taken across the complete packet of 304 bits.

Figure 11:
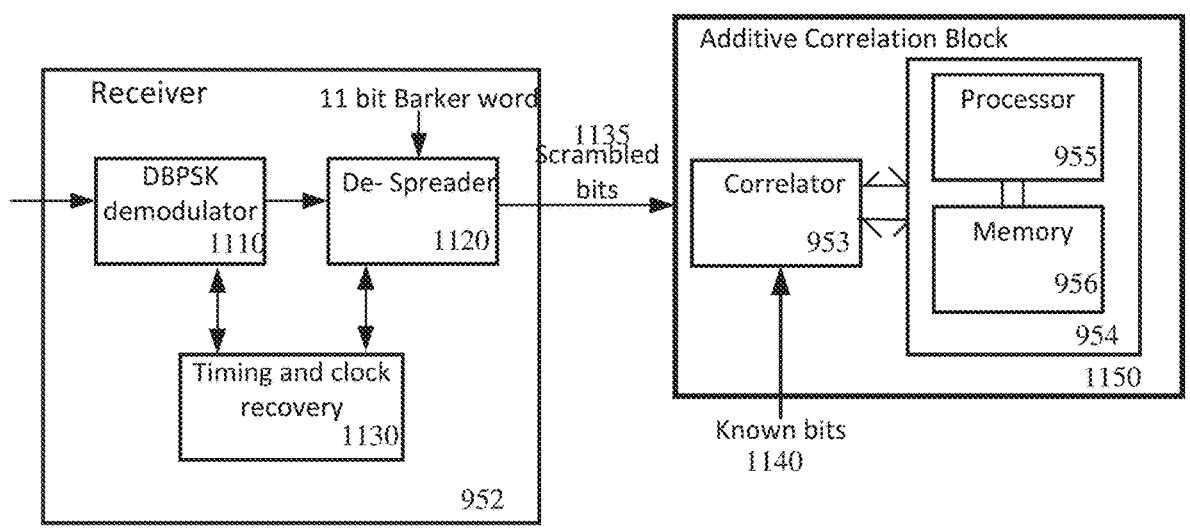
FIG. 11 is a functional block diagram of an example of an RF receiver and additive correlation block.

FIG. 11 is a functional block diagram of an example of an RF receiver 952 and additive correlation block 1150, according to one example of this disclosure. The received DSSS signal is demodulated and de-spread with the 11-bit Barker code in blocks 1110 and 1120 respectively. A timing and clock recovery block 1130 may be used to aid in this process. In cases where the response packet is below the noise level, the output of scrambled bits 1135 of the de-spreader 1120 may include the raw, scrambled bits that may or may not contain the expected response packet. These raw bits may be inputted to an additive correlation block 1150 comprising the correlator 953, processor 954 and memory module 955. The additive correlation block 1150 may perform the function of additive correlation as described below with reference to FIGS. 13, 14, 15, 16, and 17.

In one embodiment of the disclosure, the process of soft bit detection is employed. The DSSS signal is encoded using DBPSK signaling. If a transmitted bit is a 1, the outgoing symbol has a shift of π radians relative to the previous symbol. If a transmitted bit is a 0, the outgoing symbol has a shift of 0 radians relative to the previous symbol. Using "hard" bit detection if the phase change is greater than π/2 and less than 3π/2, the received bit is declared as a 1; otherwise it is declared a 0. Let two neighboring symbols $X_1$ and $X_2$ be defined as:

$$X_1 = e^{ic}$$

$$X_2 = e^{i(c+\theta)}$$

$X_1$ is a phasor of arbitrary phase c radians and $X_2$ is a phasor that is shifted by ϑ radians relative to $X_1$. If $X_1$ and $X_2$ are valid DBPSK symbols, then θ must be either 0 or π radians. To implement "soft" bit detection the following property is used:

$$\bar{X}_2 \cdot X_1 = \begin{cases} +1, & \text{if } \vartheta = 0 \\ -1, & \text{if } \vartheta = \pi \end{cases}$$

where $\bar{X}$ represents the conjugate operation. The operation $\bar{X}_n \cdot X_{n-1}$ should produce an all-real sequence of +1 and −1 with a perfect DSSS waveform. A soft bit detector replaces the individual bits with soft values from the output of $\text{Re}\{\bar{X}_n \cdot X_{n-1}\}$. The bit matching operation is replaced with a normalized cross correlation between the demodulated confidence values and the polar form of the target bit sequence. The correlation result is a score in the range of [−1; +1]. A score of +1 occurs for a sequence of noiseless symbols perfectly matched to the target sequence. A score of −1 occurs for a sequence of noiseless symbols perfectly inverted from the target sequence. Every score between +1 and −1 represents a lower correlation between the received waveform and target bit sequence.

Figure 12:
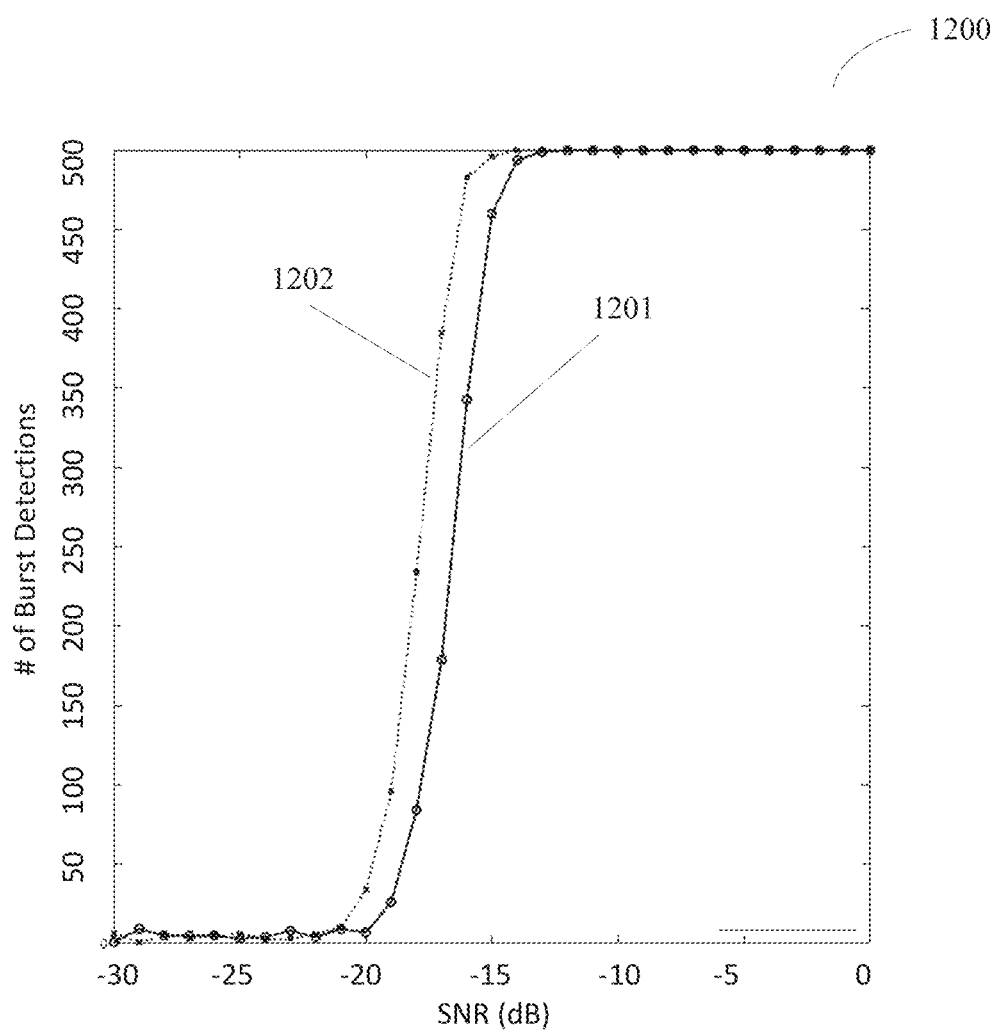
FIG. 12 shows a Monte Carlo simulation of the hard and soft bit detection schemes versus signal to noise ratio (SNR)
Figure 13A:
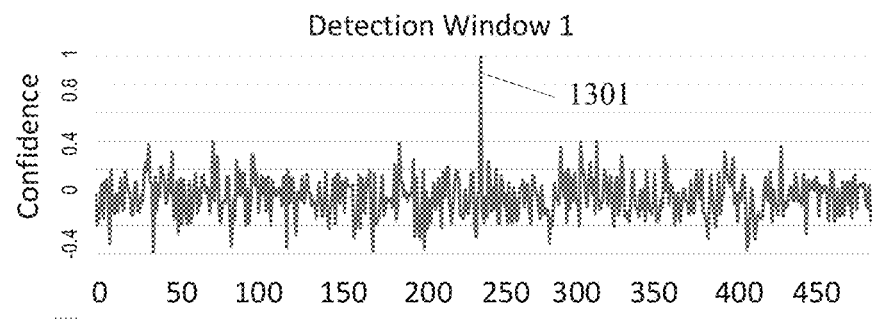
FIG. 13 illustrates 4 detection windows and a combined detection window, FIGS. 13A, 13B, 13C, 13D and 13E, each containing a wanted correlation peak at the same time offset.
Figure 13B:
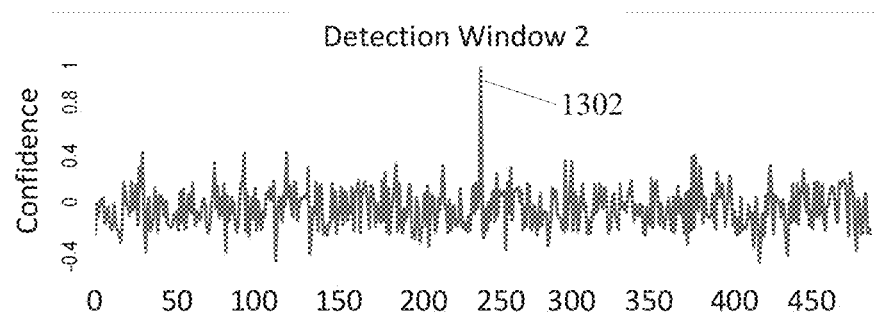
Figure 13C:
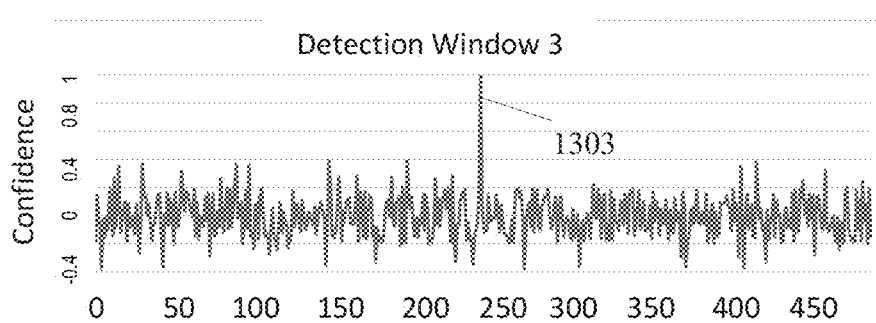
Figure 13D:
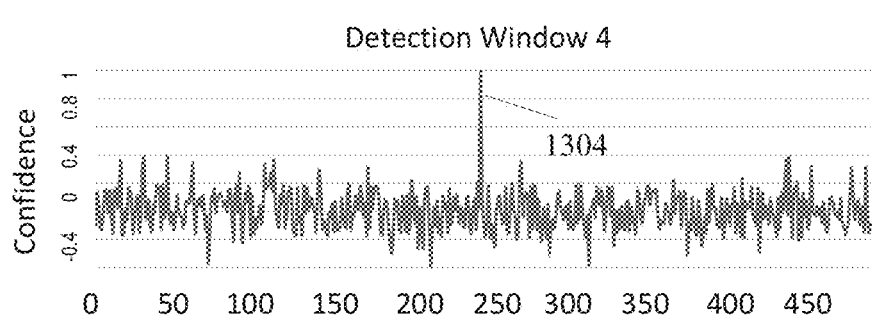
Figure 13E:
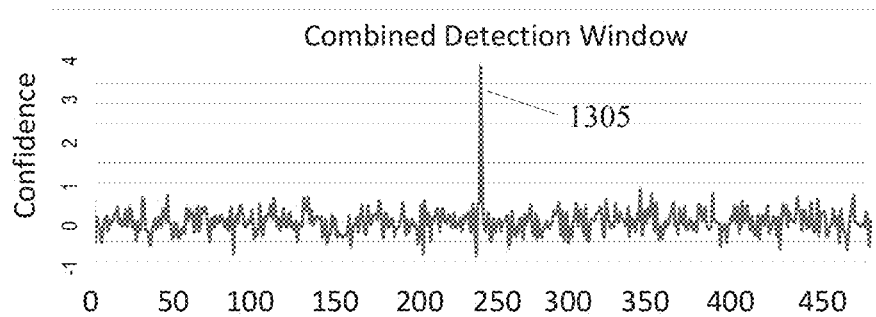

FIG. 12 shows a Monte Carlo simulation 1200 of the hard and soft bit detection schemes versus SNR. Line 1201 represents the hard bit detection and line 1202 the soft bit detection. The soft bit detection may improve sensitivity by about 1 dB.

The process of "additive correlation" across bursts is now described.

For each exchange of the ranging and response packets, 212 and 224 respectively, as described above with reference to FIG. 3 and FIG. 4, an RTT may be measured by correlating the received signal of the response packet 224 raw bits with the expected bits, as described above with reference to FIGS. 6, 7 and 9. A correlation threshold may be selected and if the received bit stream correlates above this threshold then the time of reception of the response packet 224 may be measured and compared to the time that the ranging packet 212 was transmitted in order to produce an RTT. In order to increase sensitivity, the correlation threshold may be set to a low value but this increases the possibility of false correlations due to noise and other Wi-Fi signals. As described above with reference to FIG. 4 and FIG. 5 a series of bursts of transmissions may be used. "Additive correlation" exploits the likelihood that the wanted response packets 224 will occur at the same time in each reception window 400 for each of the N transmissions during a burst. The process is to combine the results from all the windows in a burst so as to accumulate the wanted or "good" correlation peaks that occur around the same time in each window while rejecting the other unwanted or "bad" correlation peaks which will be occurring at random times in each window.

Assuming that the sampling rate is S samples per second, a correlation value may be produced for every sample. During the reception window 400 a correlation value, C, may be derived for every sample. Hence, $C = \{c_1, c_2, \ldots c_W\}$ where W is the number of samples in the reception window.

FIG. 13 illustrates the combining of 4 detection windows each containing a wanted correlation peak at the same time offset. FIG. 13A is a graphical representation of the output of correlator 953 across an initial reception window 400. The wanted correlation peak 1301 in this example is above the unwanted peaks. Similarly FIGS. 13B, 13C and 13D are graphical representations of subsequent outputs from correlator 953 across the next three reception windows 400 respectively. The corresponding wanted correlation peaks 1302, 1303 and 1304 may be clearly observed. FIG. 13E is a graphical representation of the result of the summation of the results of FIGS. A, B, C, and D. FIG. 13E shows that by summing the results of all the correlation windows, the combined wanted correlation peak 1305 grows faster than the summation of the noise or unwanted peaks.

In the general sense, Wi-Fi targets, 120, will exhibit a dither in their turnaround time, ($t_{SIFS}$) 332, resulting in a jitter, Tv, between the relative timing of the correlation peaks 1301, 1302, 1303, 1304. A value in the order of 2 μs may be assumed for this variation.

Figures 14A, 14B, 14C, 14D:
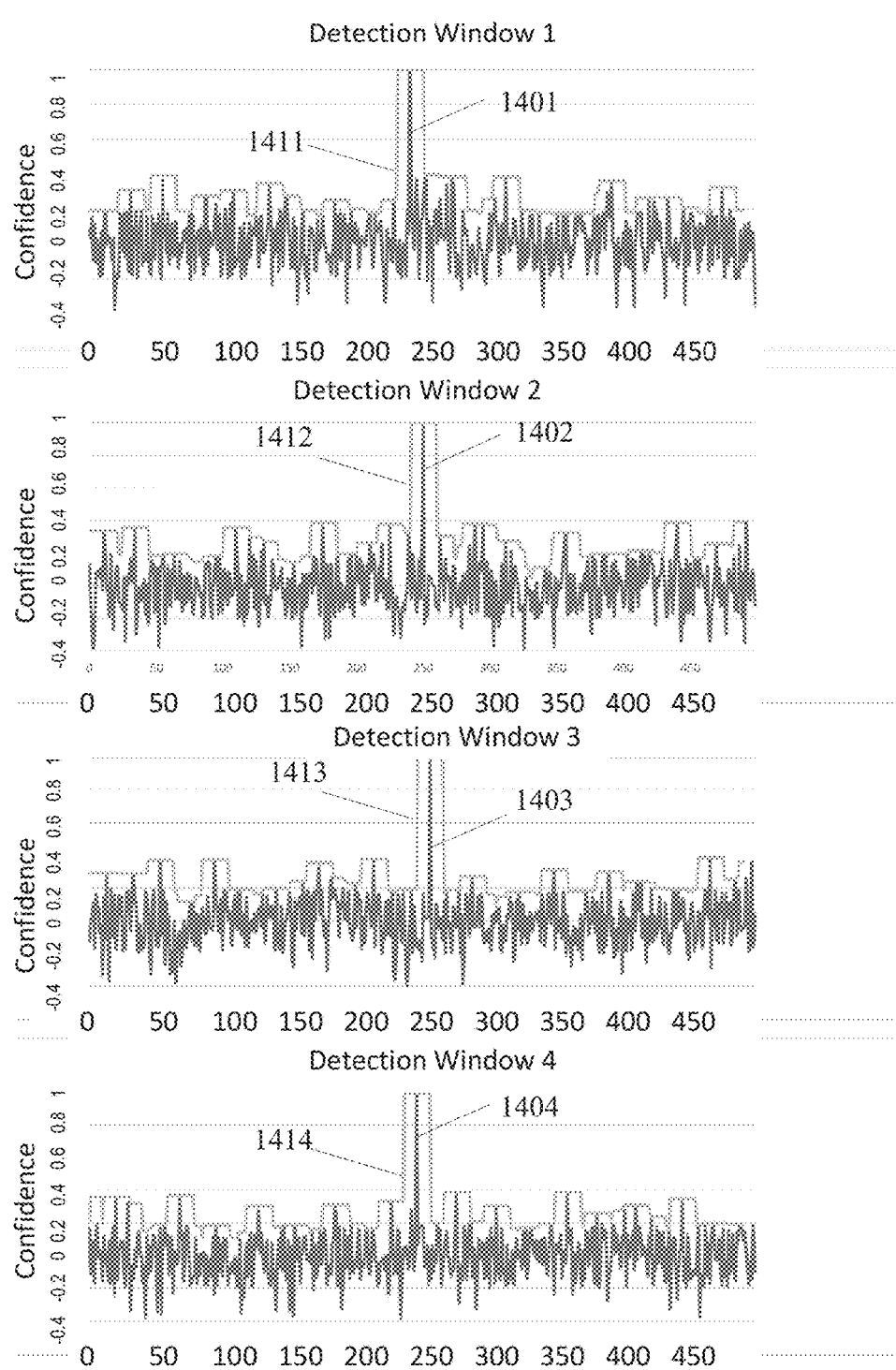
FIG. 14 illustrates 4 detection windows, FIGS. 14A, 14B, 14C and 14D, each containing wanted correlation peaks that differ in time offset due to the SIFS jitter at the target station.
Figure 15:
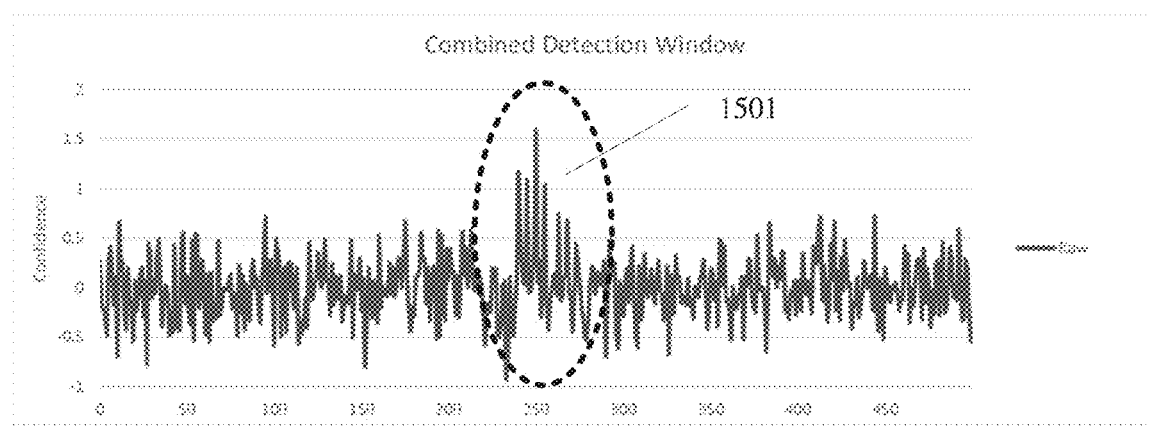
FIG. 15 is the graphical representation of the summation of the results shown in FIGS. 14A, 14B, 14C and 14D.

FIG. 14 illustrates 4 detection windows, FIGS. 14A, 14B, 14C and 14D, each containing wanted correlation peaks, 1401, 1402, 1403 and 1404 respectively that differ in time offset due to the SIFS jitter at the target station 120. FIG. 15 is the graphical representation of the summation of the results shown in FIGS. 14A, 14B, 14C and 14D. The simple summation process results in a collection of small peaks 1501 and there is no effective gain in the wanted correlation peaks due to the SIFS jitter in the target station 120.

In one embodiment of this disclosure a rolling maximum over a duration equal to the expected SIFS jitter is applied to the output of the correlator in each window.

Let the number of samples corresponding to the assumed maximum jitter value be s. For example, if the sampling rate S is 20 Msps, and the maximum jitter Tv is 2 μs, then the number of samples, s, corresponding to the maximum jitter is 40. The rolling maximum value M is defined as:

$$\text{For } k = 0 \text{ to } (W-s), \; M_{k+\frac{s}{2}} = \max\{C\}_k^{k+s}$$

Where W=number of samples in a reception window, Trw 400, values of C are correlation values And s=number of samples in the assumed maximum jitter of the response packet 224. The function $$M_{k+\frac{s}{2}}$$

is the maximum correlation value between k and k+s.

The results of applying the rolling maximum measurement to the detection windows shown in FIGS. 14A, 14B, 14C, and 14D are 1411, 1412, 1413, and 1414 respectively.

Figure 16:
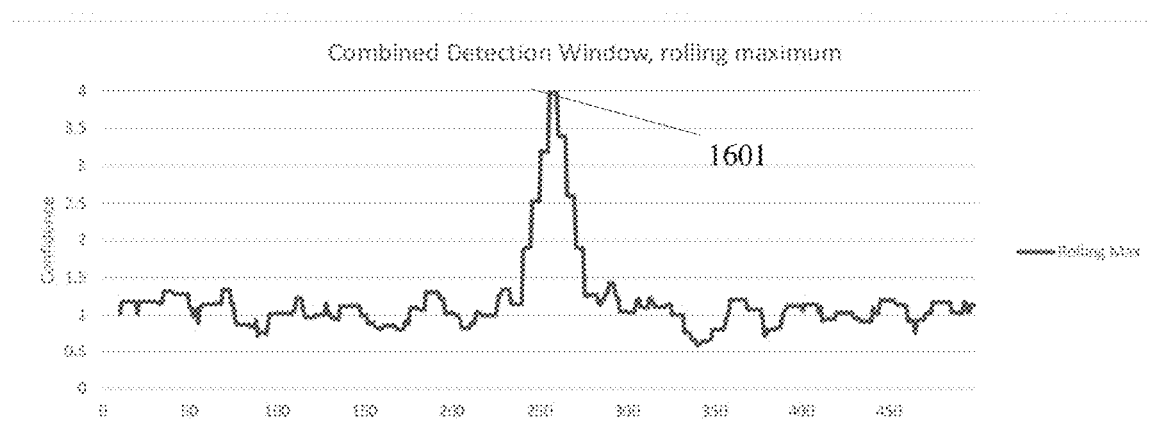
FIG. 16 is the graphical representation of the summation of the rolling maximum values.

FIG. 16 is the graphical representation of the summation of the rolling maximum values, 1411, 1412, 1413, and 1414, shown in FIGS. 14A, 14B, 14C and 14D respectively. By ensuring that the rolling maximum window s is wide enough to cover the actual jitter in the underlying response packets 224, it may be seen in FIG. 16 that the maximum combined correlation value 1601 has been recovered.

Figure 17:
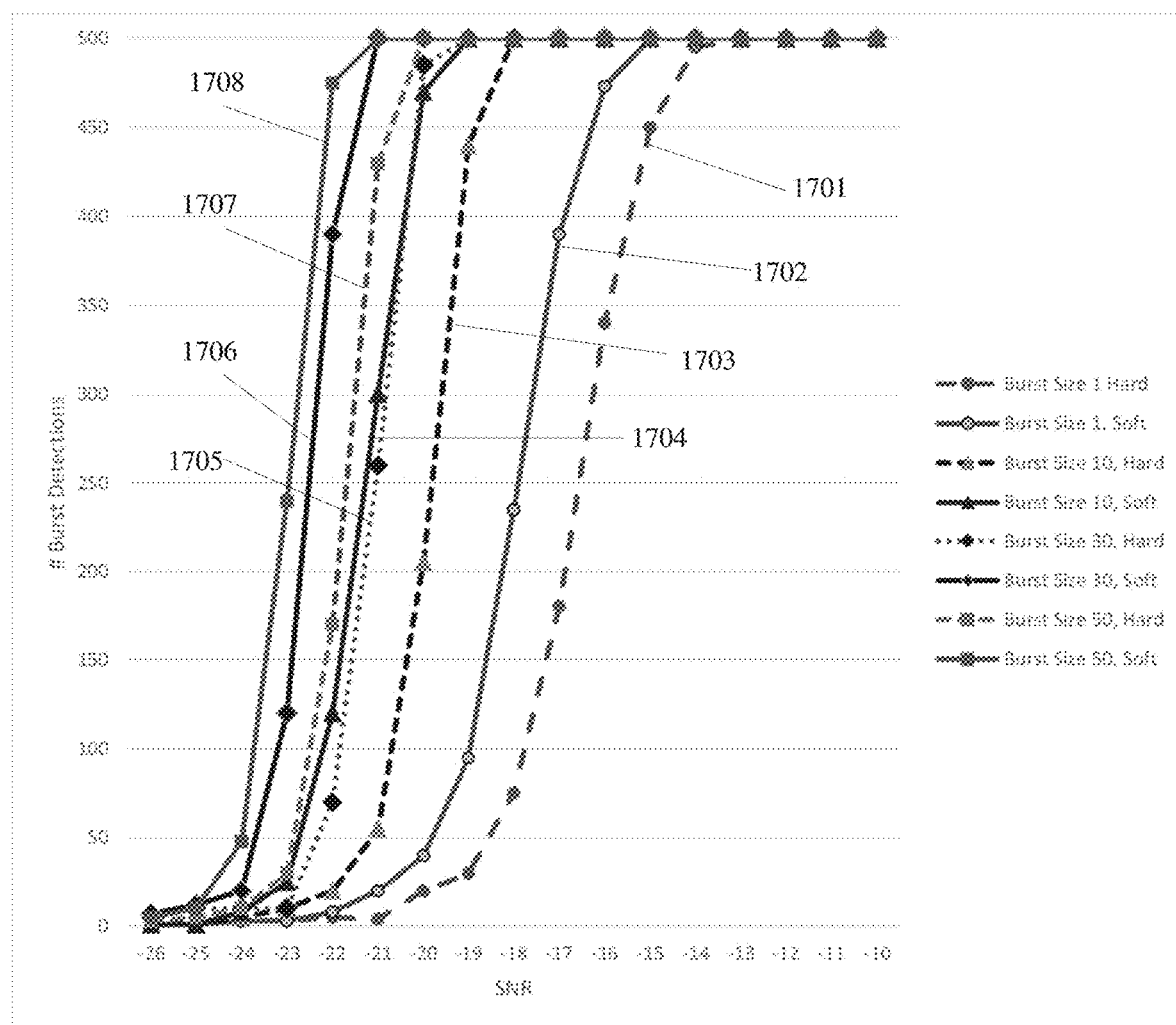
FIG. 17 is a graphical representation of the results of simulations of additive correlation.

FIG. 17 is a graphical representation of the results of simulations of additive correlation as described above. For a reception window of 96 µs, and a range of simulated SNR values, the number of detection events are counted for variations in the number of packets, N, within a burst. Both hard and soft bit detection, as described above with reference to FIGS. 11 and 12, are evaluated. For each scheme evaluated, the number of bursts is kept constant at 500. The total number of response packets evaluated is dependent upon the burst size. Burst sizes of 1, 10, 30 and 50 are evaluated. A burst size of 1 transmits a total of 500 response packets 224 whereas a burst size of 30 transmits a total of 15,000 packets. With reference to FIG. 17. eight results are shown: burst size 1, hard detection 1701, burst size 1, soft detection 1702;
burst size 10, hard detection 1703, burst size 10, soft detection 1704;
burst size 30, hard detection 1705, burst size 30, soft detection 1706; and
burst size 50, hard detection 1707, burst size 50, soft detection 1708.

From the results shown in FIG. 17, it may be understood that there are diminishing returns with increasing the number of transmitted ranging packets 212 in a burst 451. The hard detection 1707 results and soft detection 1708 results for a burst size of 50 compared to the hard and soft detection 1705, 1706 results for a burst size of 30 is in the order of 0.5 dB SNR, whereas the hard detection 1705 and soft detection 1706 results for burst size of 30 compared to the hard detection 1703 results and soft detection 1704 results for a burst size of 10 is in the order of 2 dB SNR. The hard detection 1706 result for a burst size of 30 with soft detection indicates an improvement in the order of 6 dB over hard detection 1701 result for a burst size of 1 with hard decoding.

Figure 18:
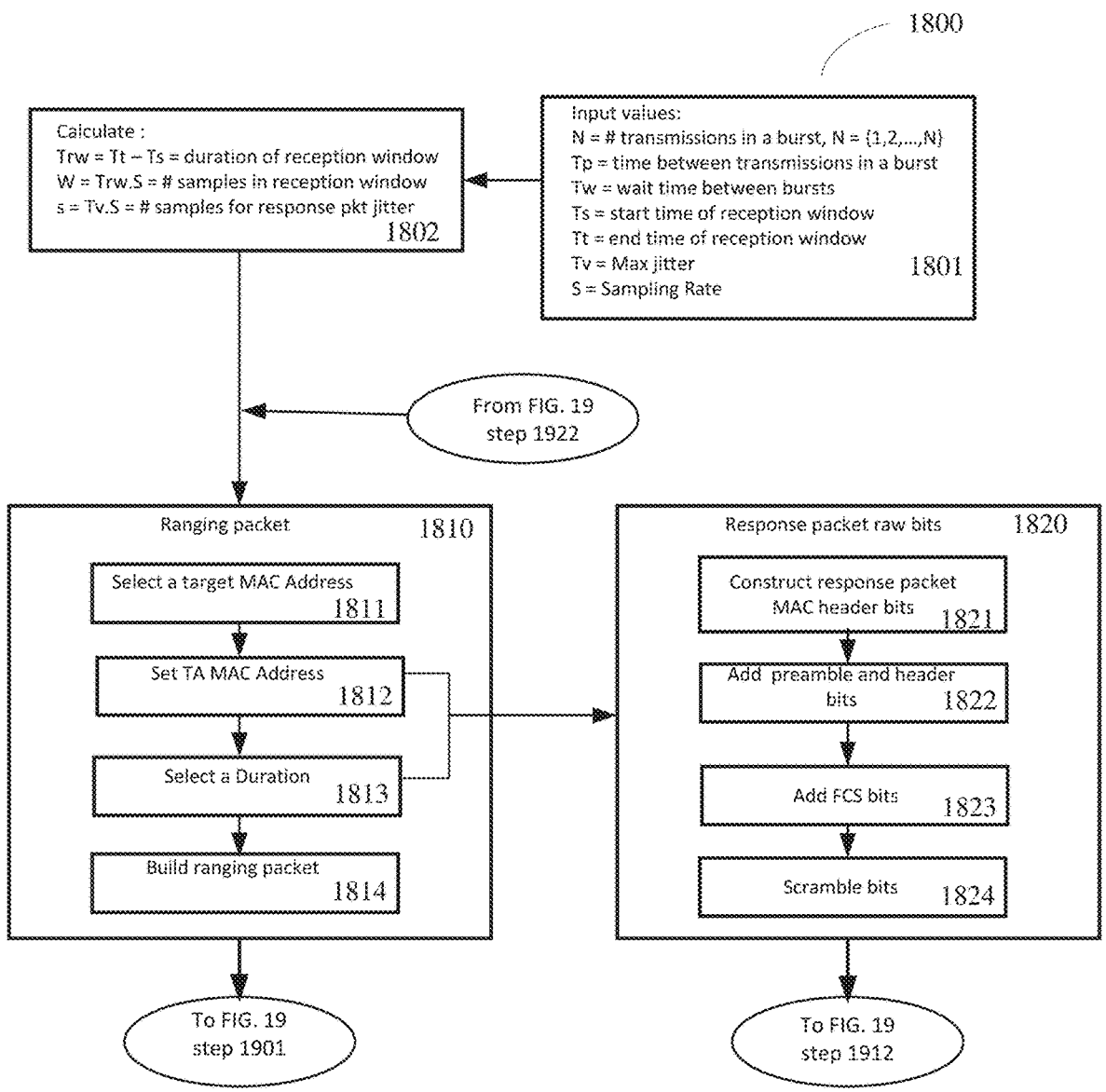
FIG. 18 is a flow diagram 1800 of an example of one embodiment of the of the geo-location process.
Figure 19:
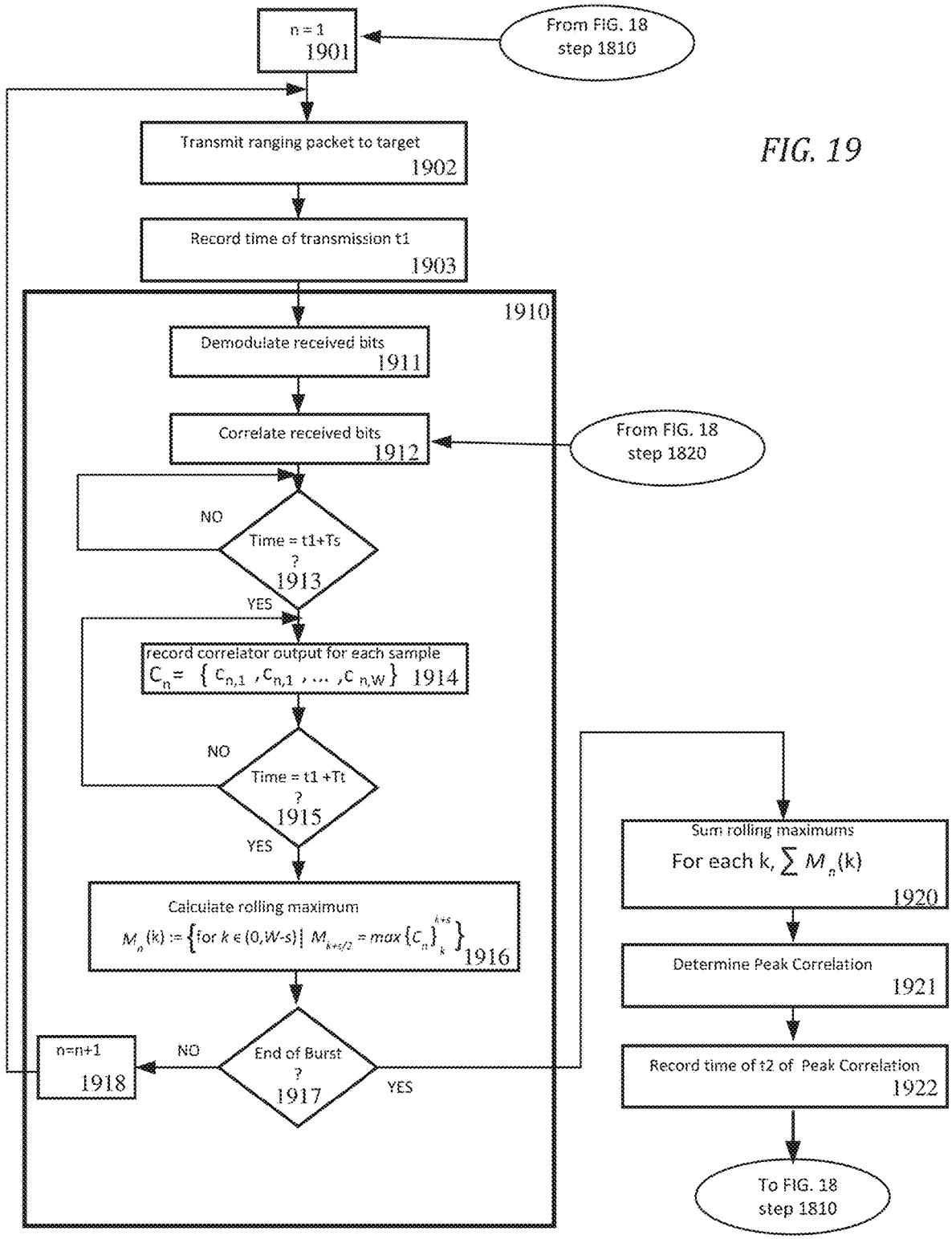
FIG. 19 is a continuation of the flow diagram of FIG. 18.

FIGS. 18 and 19 are a flow diagram 1800 of an example of one embodiment of the of the geo-location process as described in FIGS. 3 and 4, utilizing the example wireless communication device 900 which according to an embodiment of the disclosure may be used as or as part of the airborne measuring station 110. The process may start with step 1801 where a number of values are inputted. These values may be inputted to the processing circuitry 954 in the wireless receiver 950. In some embodiments, the values inputted may include:

N, the number of transmissions in a burst;
Tp, 430, the time between transmissions in a burst;
Tw, 471, the wait time between bursts;
Ts, 410, the start time of the reception window;
Tt, 420, the end time of the reception window;
Tv, the max jitter of response packets 224; and
S, the sampling rate.

Step 1801 may be followed by step 1802 where certain values may be calculated. In some embodiments, the calculated values may include:

Trw, 400, the duration of the reception window, Trw=Tt−Ts;
W, the number of samples in the reception window, W=Trw·S; and
s, the number of samples corresponding to the response packet jitter, s=Tv·S.

These calculations may be performed by the processing circuitry 954 in the wireless receiver 950.

Step 1802 may be followed by step 1810 where the ranging packet 212 is built. Step 1810 may be performed by the processing circuitry 920 in the wireless transmitter 910.

Step 1810 may include steps 1811, 1812, 1813 and 1814. In step 1811, the MAC address of the target station 120 is selected. Step 1811 may be followed by step 1812 where the MAC address to be used in the ranging packet 212 is set. In the ranging packet 212, which may be an RTS or a data null, this MAC address will be the TA Address. In the corresponding response packet 224, this MAC address will be the RA 833. Step 1812 may be followed by step 1813 where a duration value is selected for the MAC header of the ranging packet 212. This effectively sets the value of the duration field 832 expected in the response packet 224. The value of the duration field 832 in the response packet 224 will be equal to the value of the duration field in the ranging packet 212 minus SIFS minus the length of the response packet 224. Hence, by setting a known specific value in the duration field a unique value for the duration field 832 in the response packet 224 is set. Step 1813 may be followed by step 1814 where the MAC header and payload for the ranging packet 212 is constructed.

Step 1810 may be followed by step 1901 where the value for a variable n is initialized. Step 1901 may be followed by step 1902 where the ranging packet 212 may be transmitted. Step 1902 may include taking the MAC Header and payload constructed in step 1814, adding the preamble and header, and then scrambling, spreading and modulating the bits as performed by the RF transmitter 911 described in FIG. 9. Step 1902 may be followed by step 1903 where the time t1 of transmission of the ranging packet 212 is recorded. Step 1903 may be performed by wireless receiver 950 together with the time clock 960.

The values for the MAC address in step 1812 and the duration in step 1813 may be inputted to step 1820 where the expected raw bits for the response packet 224 are determined. This transfer of information may be between processing circuitry 920 and processing circuitry 954 across data bus 990. Step 1820 may include steps 1821, 1822, 1823 and 1824. Step 1820 may start with step 1821 where the MAC header 830 for the response packet 224 is determined including the MAC address set in step 1812 as the RA 833, and duration field value 832 based upon the duration field value set in step 1813 minus SIFS minus the length of the response packet. The length of a CTS or ACK packet at 1 Mbps is 304 µs, and SIFS is 10 µs, so the expected value for the duration field 832 is a value Th 314 less than the duration set in step 1813. The determination of the MAC address and duration field may be performed by the processing circuitry 920. Step 1821 may be followed by step 1822 where the preamble and header bits are added to the MAC header bits constructed in step 1821. Step 1822 may be followed by step 1823 where the FCS bits 840 are calculated for the expected response packet 224. Step 1823 may be followed by step 1824 where the complete response packet bits, constructed in steps 1821, 1822, and 1823 are scrambled assuming the fixed seed specified for HR/DSSS in IEEE 802.11—2016. The output from step 1820 is the bit stream 1135 representing the expected, scrambled, raw bit stream of the response packet 224.

Step 1903 may be followed by step 1910 where it is determined if a response packet 224 has been received. Step 1910 may include steps 1911, 1912, 1913, 1914, 1915, 1916, 1917 and 1918. Step 1910 may start with step 1911 where the incoming received signal is demodulated and de-spread resulting in the raw scrambled bits 1135, as described above with reference to FIG. 11. Step 1911 may be performed by the RF receiver 952. Step 1911 may be followed by step 1912 where the raw scrambled bits 1135 may be correlated against the expected raw bit stream 1140 obtained from step 1820, as explained above with respect to FIGS. 10 and 11. Step 1912 may be followed by step 1913 where a check is made if the reception window has started. At time (t1+Ts) the reception window opens. The value of t1 is taken from step 1903 and the value for Ts 410 is inputted at step 1801. This check may be performed by the processing circuitry 954 in the wireless receiver 950. If the reception window has not opened, then the process waits at step 1913. If the time (t1+Tt) has elapsed, as determined at step 1913, then the process may proceed to step 1914 where the correlation values $C_n = \{C_{n,1}, c_{n,2}, \ldots, C_{n,W}\}$ for each sample are recorded. The value for W, the number of samples in the reception window, is calculated at step 1802. Step 1910 1914 may be followed by step 1915 where a check is made to determine if the reception window has closed. At time (0+Tt) the reception window closes. The value of t1 is taken from step 1903 and the value for Tt 420 is inputted at step 1801. If the reception window has not closed then the process continues at step 1914 to record the correlator values $C_n$. When the reception window closes, as determined by step 1915, step 1915 may be followed by step 1916 where the rolling maximum, $$M_n(k) := \left\{ \text{for } k \in (0, \text{W-s}) \,\middle|\, M_{k+\frac{s}{2}} = \max\{C_n\}_k^{k+s} \right\}$$

for the correlation results recorded in step 1914, is calculated. The process of the rolling maximum calculation is described above with reference to FIG. 14. This calculation may be performed by the processing circuitry 954 in the wireless receiver 950.

Step 1916 may be followed by step 1917 where a check is made to determine if the burst of transmissions of request packets 214 has ended. If, in step 1917, it is determined that the burst has not ended then step 1917 may be followed by step 1918 where the variable n is incremented and the process returns to step 1902 where another ranging packet 212 is transmitted. Several methods may be used to determine if the burst has ended. One method may include noting the value of the variable n and if n=N, then the burst has ended. To account for the possibility that a request packet 214 may have been missed, then a check may be made of the elapsed time since the time, t1, of the received request packet 214, in step 1903 and if this elapsed time is greater than, for example, 3 Tp, then it may be assumed that the burst is complete. As the wait time Tw 471 between bursts is usually much greater than Tp 430, then choosing a multiple of Tp to determine if the burst is complete is straightforward. In addition, not receiving the transmitted request packet 214 should be a rare event. The determination whether the burst has ended may be performed by the processing circuitry 954 in the wireless receiver 950.

If, at step 1917, it is determined that the burst is complete, then step 1917 may be followed by step 1920 where the individual rolling maximums, for each reception window, for each of the n received bursts, are summed, as described above with reference to FIGS. 14 and 16.

for each k, $$\sum_{n=1}^{N} M_n(k),$$

step 192U may be performed by the processing circuitry 954 in the wireless receiver 950 or by the general purpose processor 980. Step 1920 may be followed by step 1921 where the peak of the sum of the rolling maximums is determined, $$\max \sum_{n=1}^{N} M_n(k),$$

as described above with reference to FIG. 16. Step 1921 may be performed by the processing circuitry 954 in the wireless receiver 950 or by the general purpose processor 980. Step 1921 may be followed by step 1922 where the time t2 of the peak correlation determined in step 1921 is recorded. The time t2 is used as the time that the response packet 224 was received and then used to calculate the RTT=(t2−t1). Step 1922 may be performed by the processing circuitry 954 in the wireless receiver 950 or by the general purpose processor 980 together with the time clock 960. The process may then return to step 1810 where another ranging packet 212 is transmitted, or may terminate.

Figure 20:
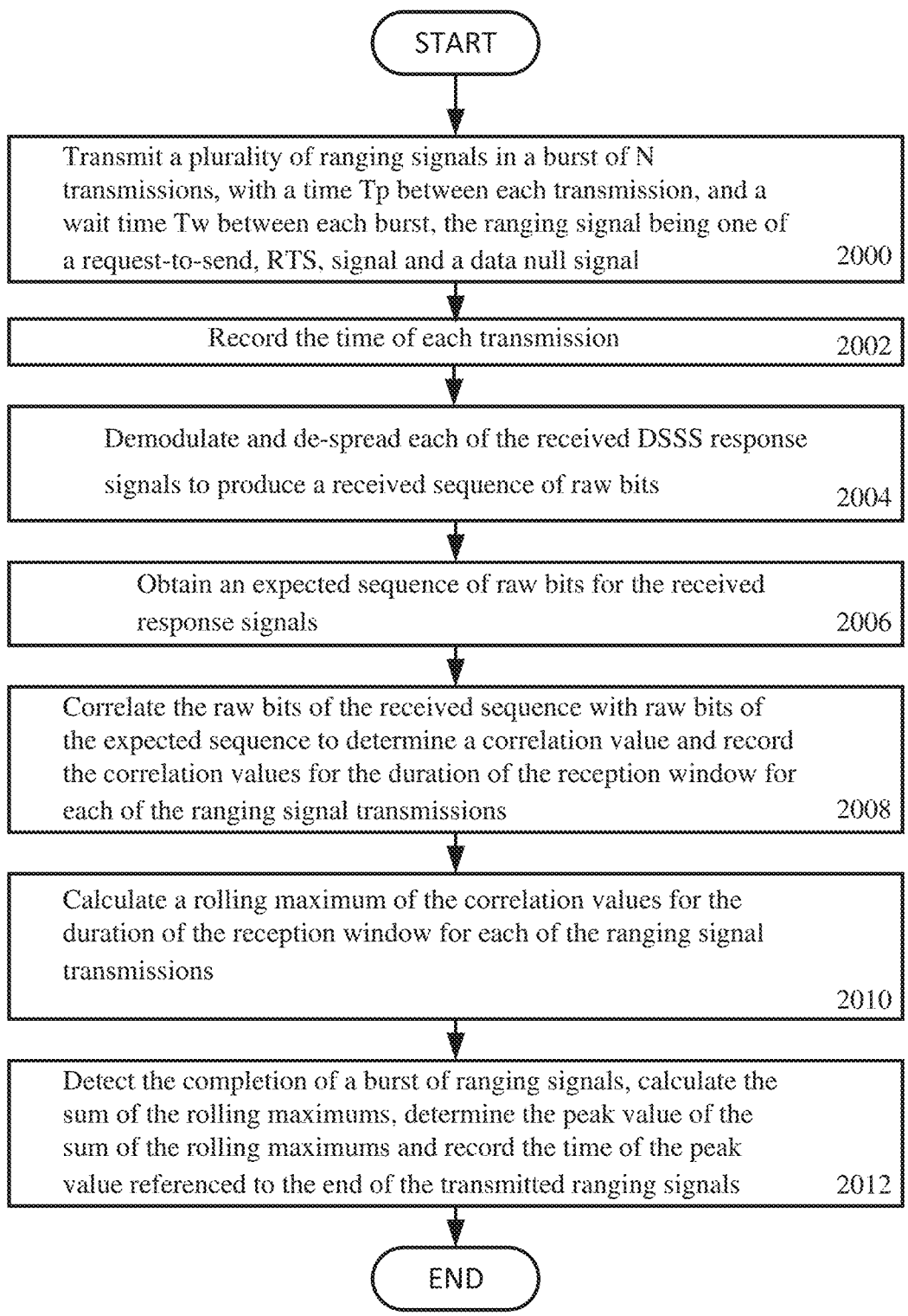
FIG. 20 is a flow diagram of an example of a process for determining at a first wireless device, such as an airborne station, a geo-location of a second wireless device, such as a mobile ground station.

FIG. 20 is a flowchart of an exemplary process for determining at a first wireless device, such as an airborne station, a geo-location of a second wireless device, such as a mobile ground station. The process includes transmitting, via the RF transmitter 911, a plurality of ranging signals in a burst of N transmissions, with a time Tp between each transmission, and a wait time Tw between each burst (step 2000), and recording a time of each transmitted ranging signal (step 2002). The process further includes receiving, via the wireless receiver 950, demodulating, via DBPSK demodulator 1110 and de-spreading, via de-spreader 1120, the received DSSS response signal to produce a received sequence (step 2004). Also, an expected sequence is determined (step 2006). The raw bits of the received sequence are correlated, via the correlator 953, with the raw bits of the expected sequence to determine a correlation value indicative of an extent to which the received sequence matches the expected sequence and the correlation values are recorded for the duration Trw 400 of the reception window for each of the ranging signal transmissions (step 2008). The process further includes calculating a rolling maximum of the correlation values for the duration of the reception window for each of the ranging signal transmissions (step 2010). The process further includes detecting the completion of a burst of ranging signals, calculating the sum of the rolling maximums, determining the peak value of the sum of the rolling maximums and recording the time of the peak value referenced to the end of the transmitted ranging signals (step 2012).

FIG. 21 is a flow diagram of an exemplary process for achieving greater sensitivity and range for geo-location of a ground station by an airborne station. The process includes transmitting, via transmitter 911, a plurality of ranging signals in a burst of N transmissions, with a time Tp between each transmission, and with a wait time Tw between each burst (step 2014). The process includes recording, via the transmitter 911 or the processing circuitry 920, times of transmission for each of the ranging signals in a burst (step 2016). The process also includes setting, via the processing circuitry 920, a duration and start and end times of a reception window that starts at time Ts after the transmission of each ranging signal and ends at time Tt after the transmission of each ranging signal (step 2018). The process also includes receiving, via the receiver 952 direct sequence spread spectrum (DSSS) response signals transmitted from a second WD, each DSS response signal being in response to one of the plurality of ranging signals (step 2020). The process also includes demodulating and de-spreading, via the receiver, 952, each of the received DSSS response signals to produce a received sequence of bits (step 2022). The process also includes determining an expected sequence of bits for the received response signals (step 2024). The process further includes correlating, via the processing circuitry 954, the received sequence of bits with the expected sequence of bits to determine a correlation value, the correlation value being indicative of an extent to which the received sequence matches the expected sequence (step 2026).

FIG. 22 is a continuation of the flow diagram of FIG. 21. The process includes recording, via the memory module 956, a plurality of correlation values for a duration of a reception window for each of the plurality of ranging signal transmissions (step 2028). The process also includes calculating, via the processing circuitry 954, a rolling maximum value, M, of the recorded correlation values for the duration of the reception window for each of the plurality of ranging signal transmissions (step 2030). The process performed by the processing circuitry 954 also includes detecting a completion of a burst of ranging signals (step 2032); calculating a sum of the rolling maximums (step 2034); determining a peak value of the sum of the rolling maximums (step 2036); and recording a time of the peak value referenced to an end of the plurality of ranging signal transmissions (step 2038). The process performed by the processing circuitry 954 also includes determining a geo-location of the second WD based at least in part on a time of transmission of a ranging signal and the time of the peak value of the sum of the rolling maximums (step 2040).

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the number of transmissions in a burst, the time between transmissions within a burst, the wait time between bursts, the start and end times of the reception window, the time allowance for the maximum jitter of the turnaround time (SIFS) of a response signal, the duration field value(s), the MAC address used in the ranging packet, the details of the hard of soft bit detector, and the details of the de-spreader and de-modulator. Accordingly, the scope should be determined not by the embodiments illustrated, but by the claims and their legal equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a first wireless device (WD), the method comprising:
   transmitting a plurality of ranging signals in a burst of N transmissions, with a time Tp between each transmission, and with a wait time Tw between each burst;
   recording times of transmission for each of the ranging signals in a burst;
   setting a duration and start and end times of a reception window that starts at time Ts after the transmission of each ranging signal and ends at time it after the transmission of each ranging signal;
   receiving direct sequence spread spectrum (DSSS) response signals transmitted from a second WD, each DSS response signal being in response to one of the plurality of ranging signals;
   demodulating and de-spreading each of the received DSSS response signals to produce a received sequence of bits;
   determining an expected sequence of bits for the received response signals;
   correlating the received sequence of bits with the expected sequence of bits to determine a correlation value, the correlation value being indicative of an extent to which the received sequence matches the expected sequence;
   recording a plurality of correlation values for a duration of a reception window for each of the plurality of ranging signal transmissions;
   calculating a rolling maximum value, M, of the recorded correlation values for the duration of the reception window for each of the plurality of ranging signal transmissions;
   detecting a completion of a burst of ranging signals;
   calculating a sum of the rolling maximums;
   determining a peak value of the sum of the rolling maximums;
   recording a time of the peak value referenced to an end of the plurality of ranging signa transmissions; and
   determining a geo-location of the second WI) based at least in part on a time of transmission of a ranging signal and the time of the peak value of the sum of the rolling maximums.

2. The method of claim 1, wherein each transmitted ranging signal is one of a request-to-send, RTS, signal and a data null signal.

3. The method of claim 1, further comprising determining parameters of the plurality of ranging signals by one of selecting a WI) receiver address (RA) to be used as a medium access control (MAC) address of the second WD, selecting a MAC address to be used as a wireless transmitter address (TA) and selecting a duration value for the duration of the reception window.

4. The method of claim 1, wherein the determination of the expected sequence of bits includes:
   constructing medium access control (MAC) header bits based on using a transmitter address (TA) of the ranging signal as a receiver address (RA) of the DSSS response signal;
   adding preamble and header bits to the MAC header bits to produce a packet; and
   scrambling the packet using a predetermined seed to produce the bits of the expected sequence.

5. The method of claim 1, wherein the rolling maximum value M is defined as:

$$\text{For } k = 0 \text{ to (W-s)}, M_{k+\frac{s}{2}} = \max\{C\}_k^{k+s}$$

where W=number of samples in the reception window, C are correlator values, s=number of samples in the assumed maximum jitter of the response packet, and $$\max\{C\}_k^{k+s}$$

is a maximum correlation value between k and k+s.

6. The method of claim 1, further comprising applying soft bit detection of the received DSSS response signals.

7. A first wireless device (WD), comprising:
   a transmitter configured to transmit a plurality of ranging signals in a burst of N transmissions, with a time Tp between each transmission, and a wait time Tw between each burst;
   processing circuitry in communication with the transmitter, the processing circuitry configured to:
      record a time of each transmission;
      receive a plurality of direct sequence spread spectrum (DSSS) response signals, each DSSS response signal being responsive to a different one of the plurality of ranging signals;
      demodulate and de-spread each of the plurality of received DSSS response signals to produce a received sequence of bits;
      determine an expected sequence of bits for the received DSSS response signals;
   a correlator in communication with the processing circuitry, the correlator configured to:
      correlate the bits of the received sequence with the bits of the expected sequence to determine a correlation value, the correlation value being indicative of an extent to which the received sequence matches the expected sequence;
      record the correlation values for a duration of a reception window for each of the plurality of ranging signal transmissions;
   the processing circuitry being further configured to:
      calculate a rolling maximum value, M, of the recorded correlation values for the duration of the reception window for each of the plurality of ranging signal transmissions;
      detect a completion of a burst of ranging signals;
      calculate a sum of the rolling maximums;
      determine a peak value of the sum of the rolling maximums;
      record a time of the peak value referenced to an end of the plurality of ranging signal transmissions; and
      determine a geo-location of the second WI) based at least in part on a time of transmission of a ranging signal and the time of the peak value of the sum of the rolling maximums.

8. The first WD of claim 7, wherein each transmitted ranging signal is one of a request-to-send, RTS, signal and a data null signal.

9. The first WD of claim 7, wherein the processing circuitry is further configured to determine parameters of the plurality of ranging signals by one of selecting a WD receiver address (RA) to be used as a medium access control (MAC) address of the second WD, selecting a MAC address to be used as a wireless transmitter address (TA) and selecting a duration value for the duration of the reception window.

10. The first WD of claim 7, wherein the determination of the expected sequence of bits includes:
constructing medium access control (MAC) header bits based on using a transmitter address (TA) of the ranging signal as a receiver address (RA) of the DSSS response signal;
adding preamble and header bits to the MAC header bits to produce a packet; and
scrambling the packet using a predetermined seed to produce the bits of the expected sequence.

11. The first WD of claim 7, wherein the rolling maximum value M is defined as:

$$\text{For } k = 0 \text{ to (W-s)}, M_{k+\frac{s}{2}} = \max\{C\}_k^{k+s}$$

where W=number of samples in the reception window, C are correlator values, s=number of samples in the assumed maximum jitter of the response packet, and $$\max\{C\}_k^{k+s}$$

is a maximum correlation value between k and k+s.

12. The first WD of claim 7, wherein the processing circuitry is further configured to apply soft bit detection of the received DSSS response signals.

13. An airborne station, comprising:
a transmitter configured to:
transmit a plurality of ranging signals in a burst of N transmissions, with a time Tp between each transmission, and a wait time Tw between each burst, a ranging signal being one of a request-to-send, RTS, signal and a data null signal;
record the time of each transmission, and
a receiver configured to:
receive a direct sequence spread spectrum, DSSS, response signal from a ground station, the DSSS response signal being spread by an 11 bit barker code, each DSSS response signal responsive to a different one of the plurality of ranging signals;
processing circuitry in communication with the transmitter and receiver, the processing circuitry configured to:
demodulate and de-spread each of the received DSSS response signals to produce a received sequence of bits;
obtain an expected sequence of bits for the received response signals;
a correlator in communication with the processing circuitry, the correlator configured to:
correlate the bits of the received sequence with bits of the expected sequence to determine a correlation value; the correlation value being indicative of an extent to which the received sequence matches the expected sequence;
record correlation values for a duration of a reception window for each of the plurality of ranging signal transmissions;
the processing circuitry being further configured to:
calculate a rolling maximum value, M, of the correlation values for the duration of the reception window for each of the plurality of ranging signal transmissions;
detect a completion of a burst of ranging signals;
calculate a sum of the rolling maximums;
determine a peak value of the sum of the rolling maximums;
record a time of the peak value referenced to an end of the ranging signal transmissions;
determine a geo-location of the second WD based at least in part on a time of transmission of a ranging signal and the time of the peak value of the sum of the rolling maximums.

14. An airborne station, comprising:
a transmitter configured to transmit a plurality of ranging signals in a burst of N transmissions;
a receiver configured to:
receive, for each ranging signal in the burst, a response signal from a ground station;
extract from each response signal a received sequence of bits; and
correlate bits of the received sequence with bits of an expected sequence to determine a correlation value, the correlation value being indicative of an extent to which the received sequence matches the expected sequence; and
processing circuitry in communication with the transmitter and receiver, the processing circuitry configured to:
calculate rolling maximum values M of correlation values determined for a reception window during which spread spectrum signals are received;
calculate a sum of the calculated rolling maximum values M;
determine a peak value of the calculated sum;
determine a geo-location of the ground station based at least in part on a time of transmission of a ranging signal and a time of occurrence of the peak value referenced to an end of the plurality of ranging signal transmissions.

15. The airborne station of claim 14, wherein the response signal is a direct sequence spread spectrum signal (DSSS) and the extracting includes despreading.

16. The airborne station of claim 14, wherein the rolling maximum value M is defined as:

$$\text{For } k = 0 \text{ to (W-s)}, M_{k+\frac{s}{2}} = \max\{C\}_k^{k+s}$$

where W=number of samples in the reception window, C are correlator values, s=number of samples in the assumed maximum jitter of the response packet, and $$\max\{C\}_k^{k+s}$$

is a maximum correlation value between k and k+s.

17. The airborne station of claim 14, wherein the processing circuitry is further configured to set a duration of the reception window based on an assumed short interframe spacing (SIFS) jitter.

18. The airborne station of claim 14, wherein the rolling maximum values M are calculated over a duration equal to an expected short interframe spacing (SIFS) jitter.

19. The airborne station of claim 14, wherein the expected sequence of bits is determined by steps that include:
- constructing medium access control (MAC) header bits based on using a transmitter address (TA) of the ranging signal as a receiver address (RA) of the response signal;
- adding preamble and header bits to the MAC header bits to produce a packet; and
- scrambling the packet using a predetermined seed to produce the bits of the expected sequence.

20. The airborne station of claim 14, wherein the processing circuitry is further configured to detect a completion of a burst of ranging signals.

* * * * *